C. L. LILLEBERG.
EXCAVATING MACHINE.
APPLICATION FILED JUNE 8, 1908.
990,487.
Patented Apr. 25, 1911.
12 SHEETS—SHEET 10.
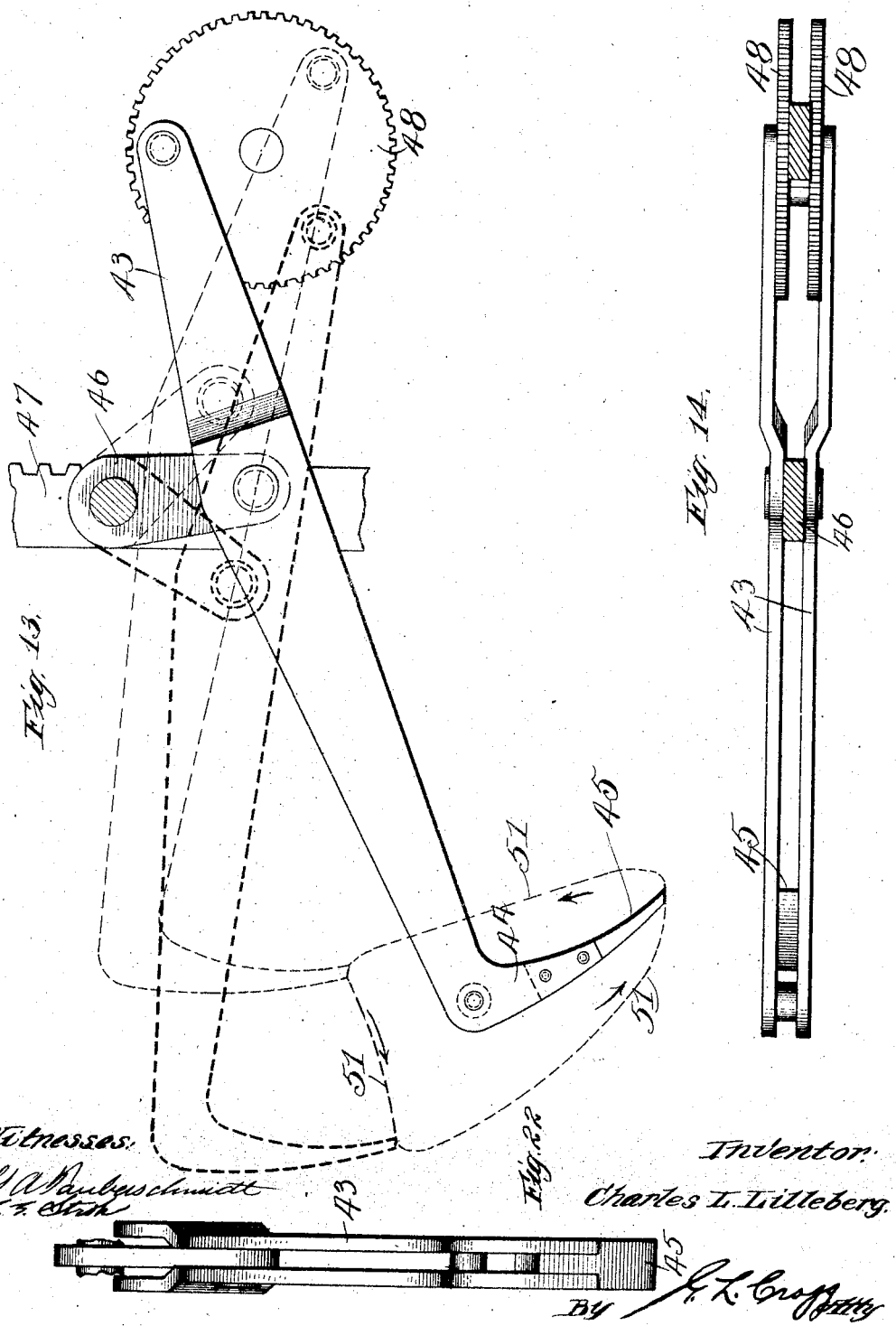

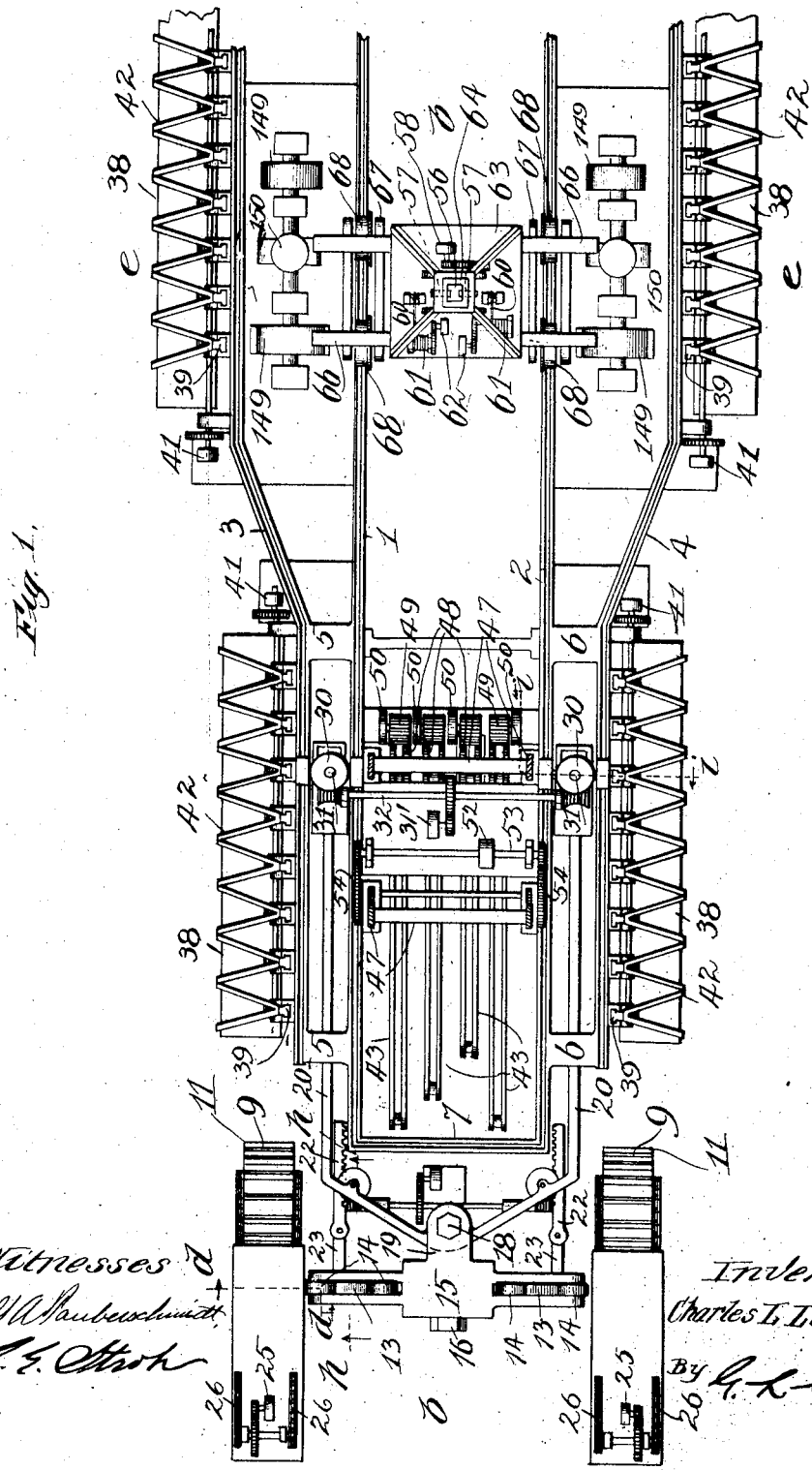

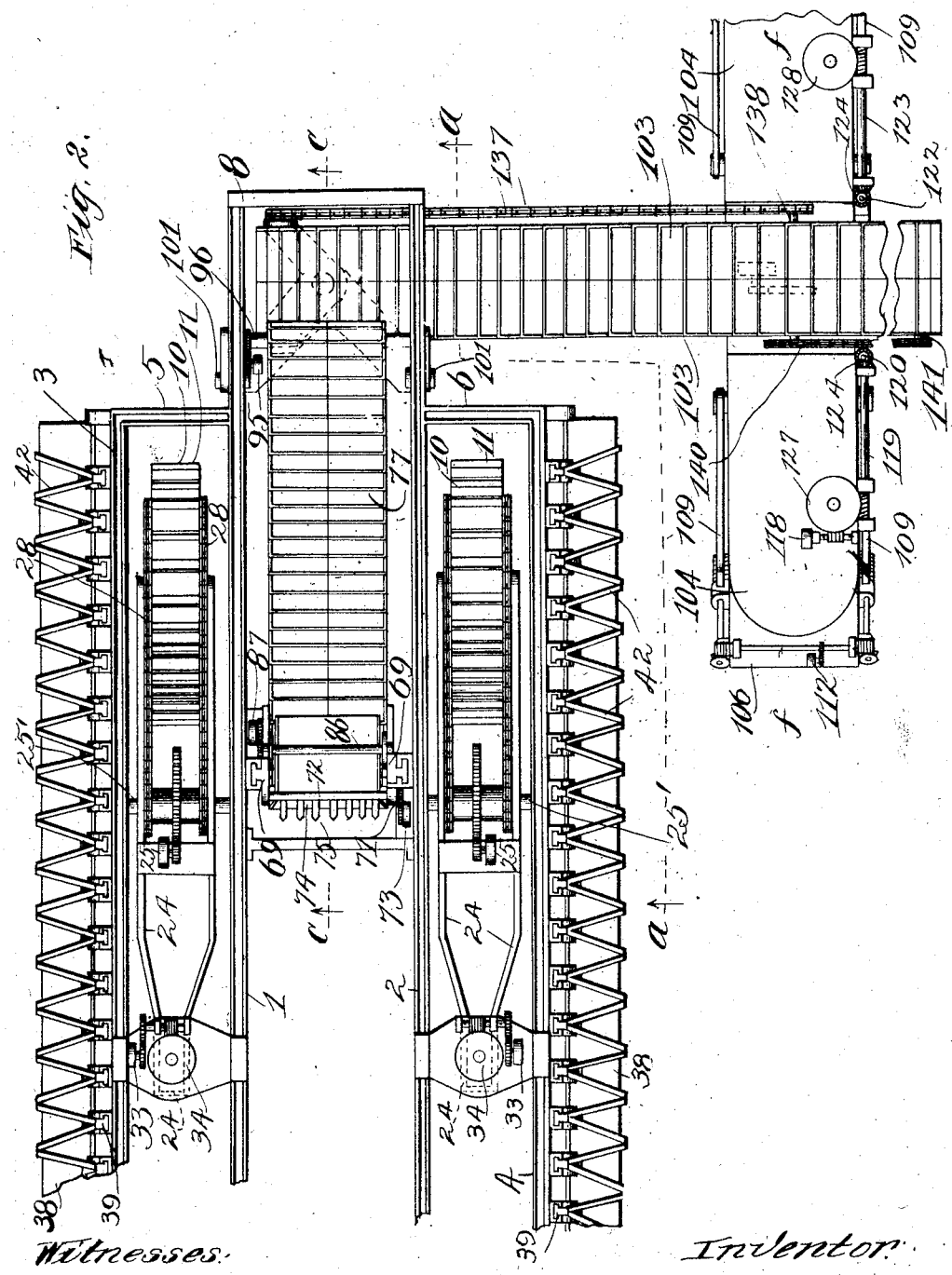

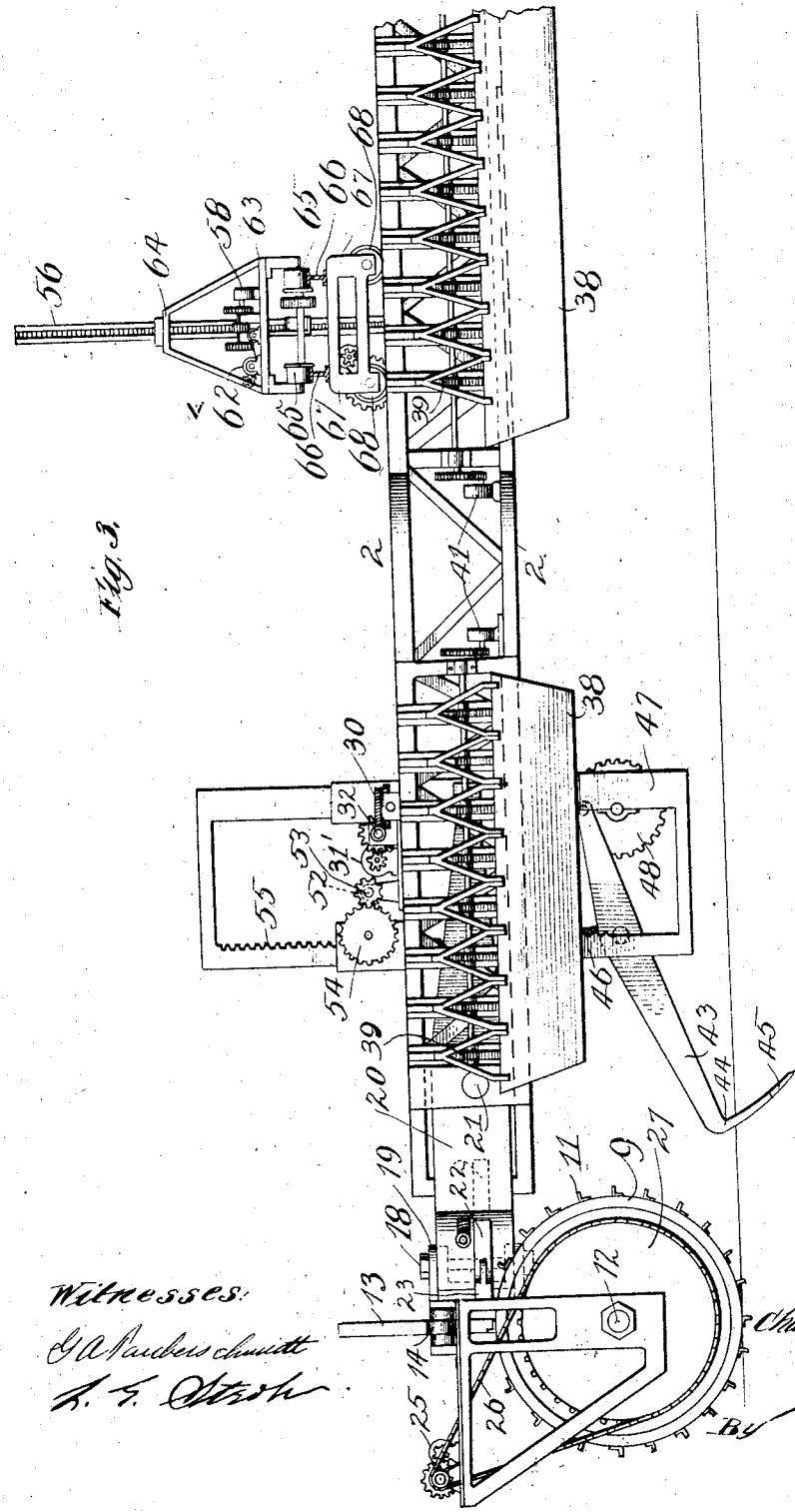

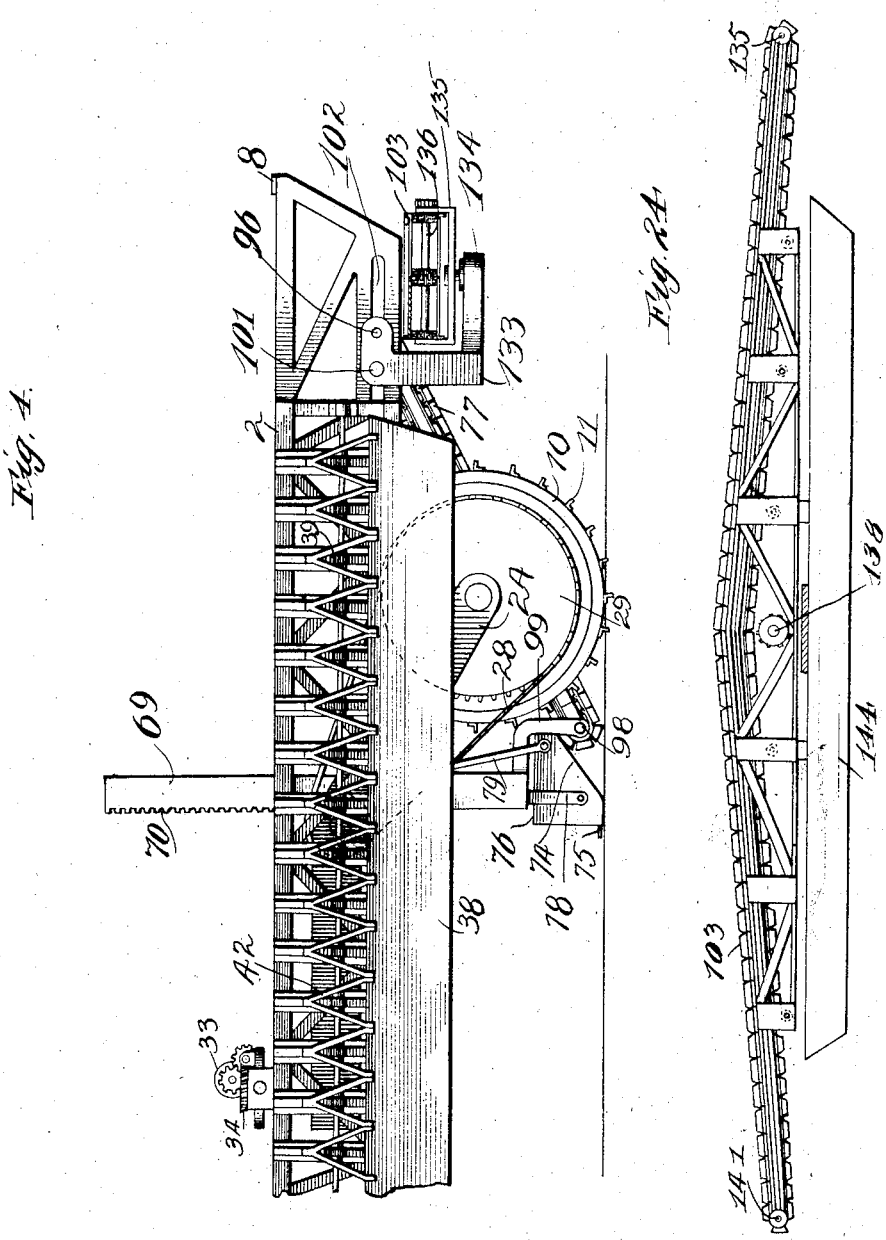

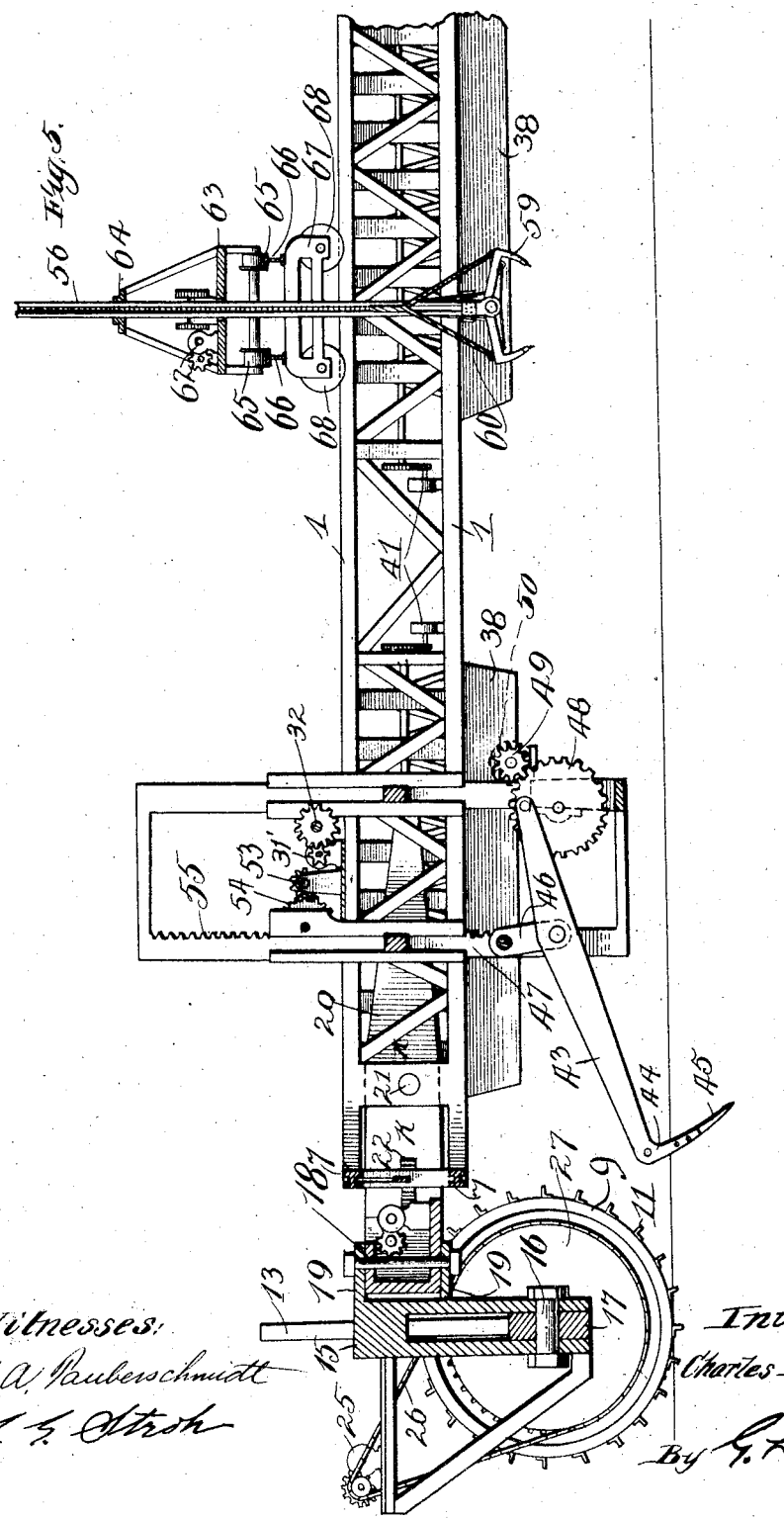

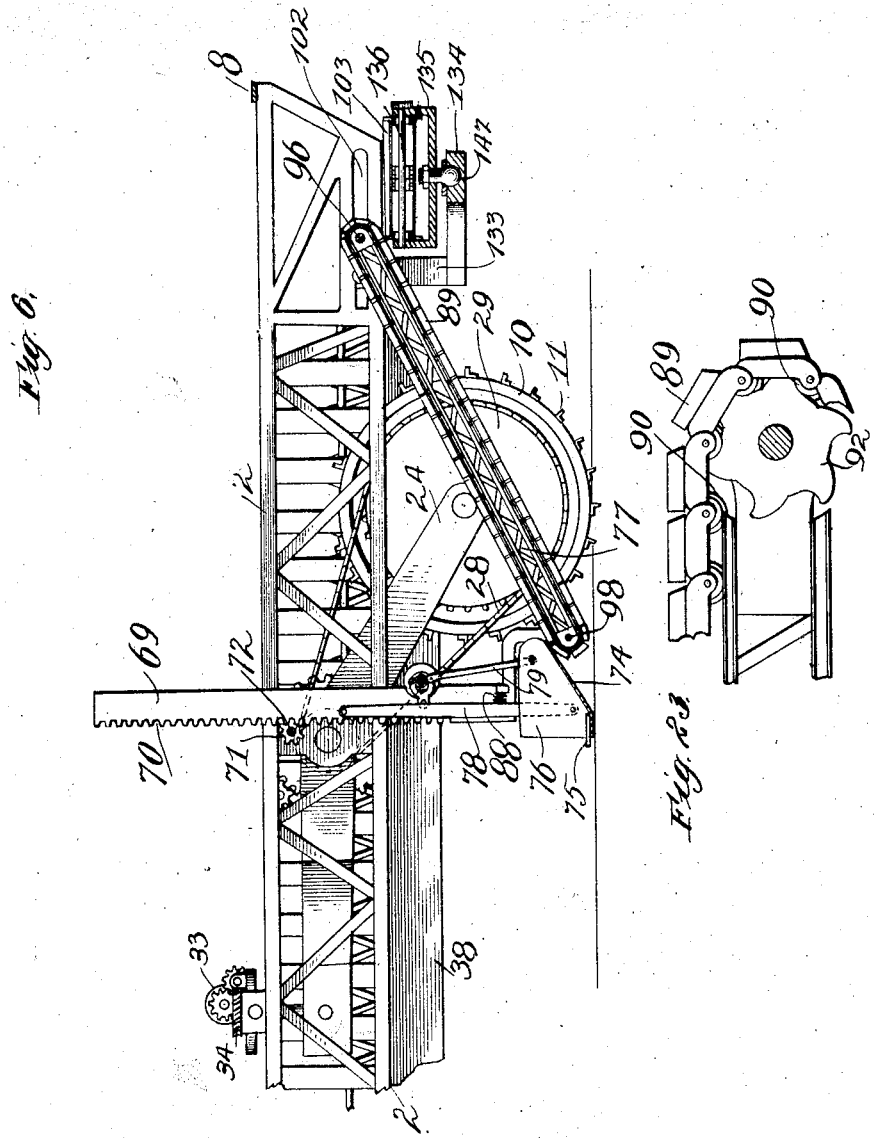

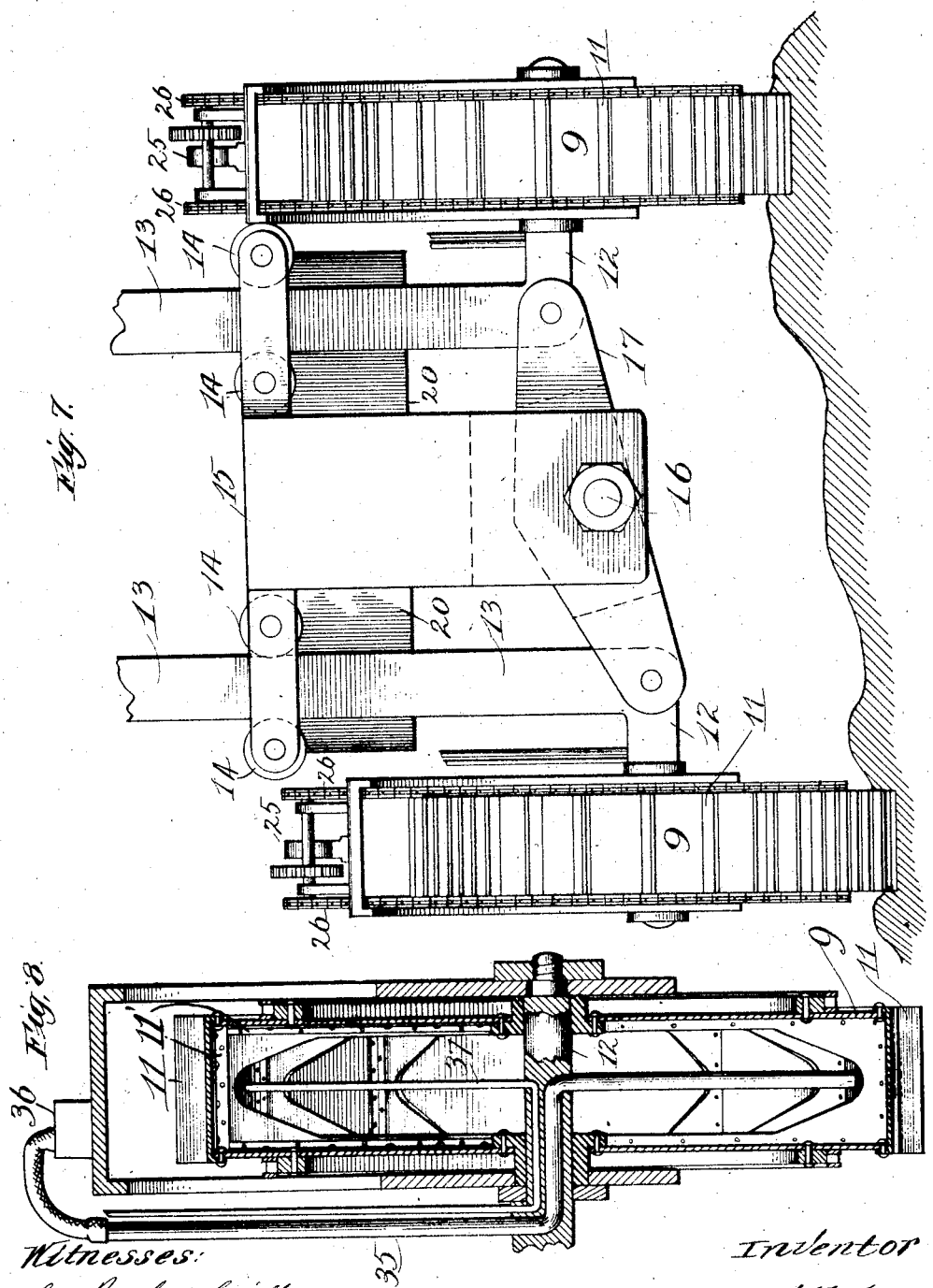

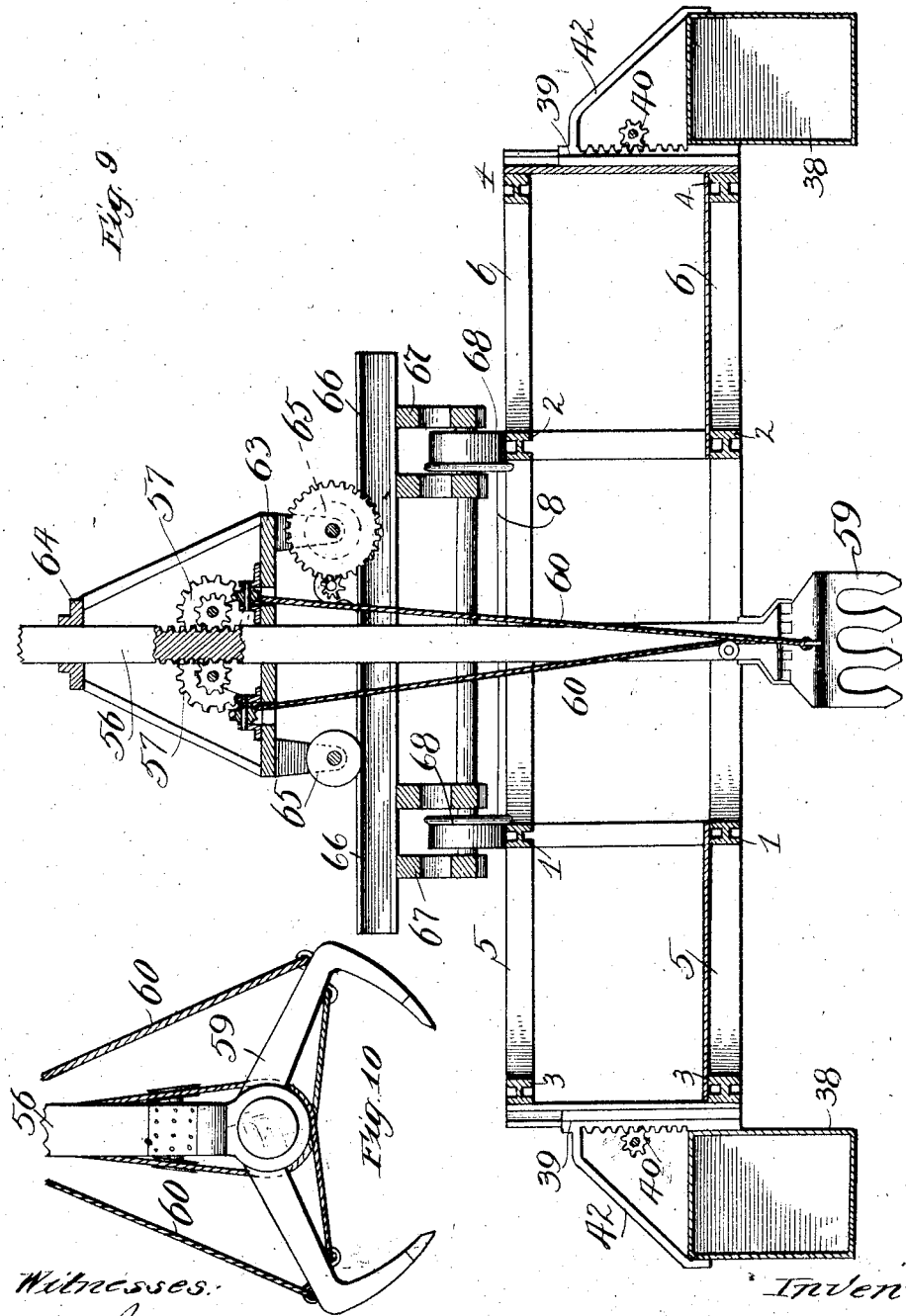

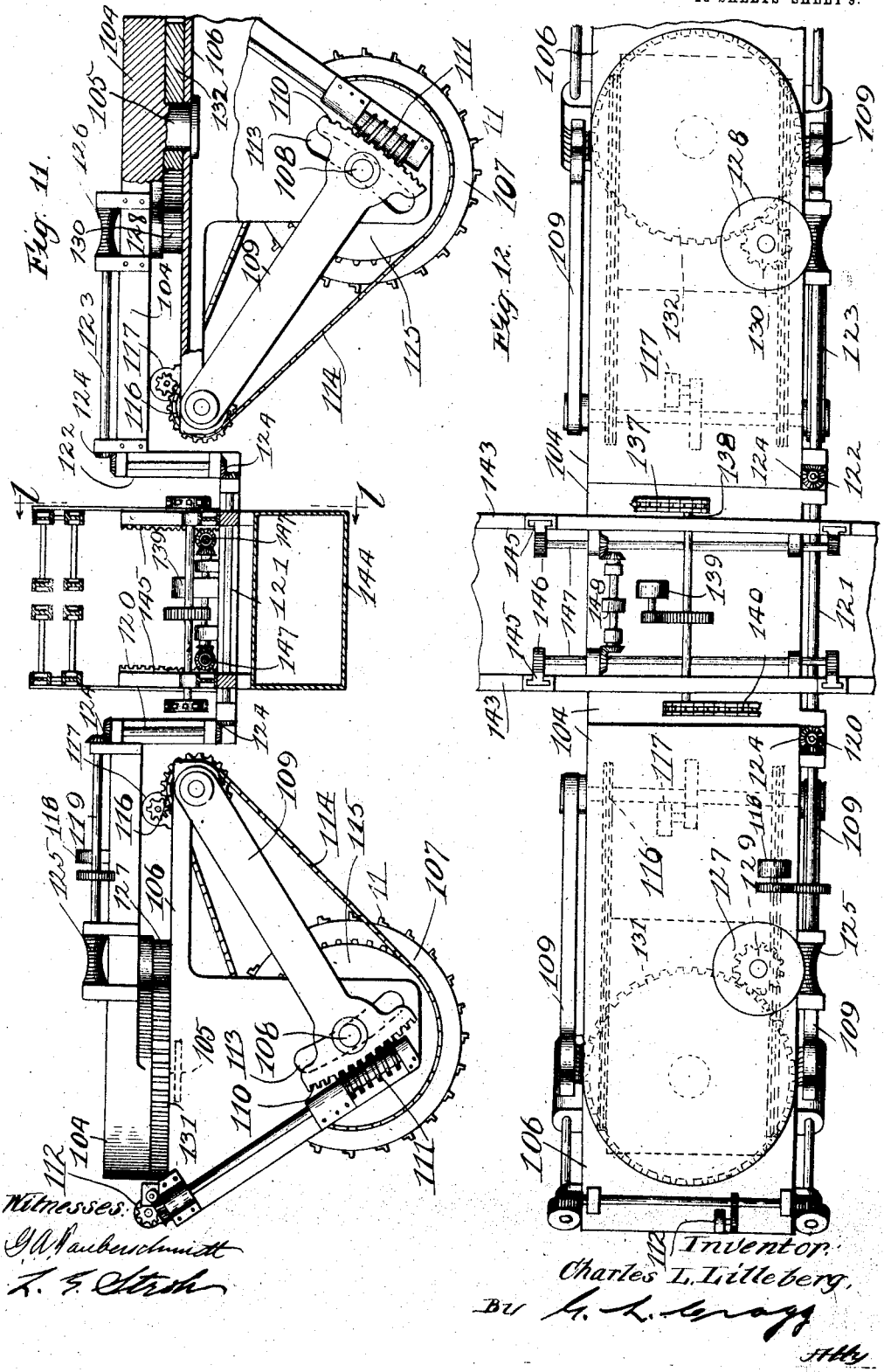

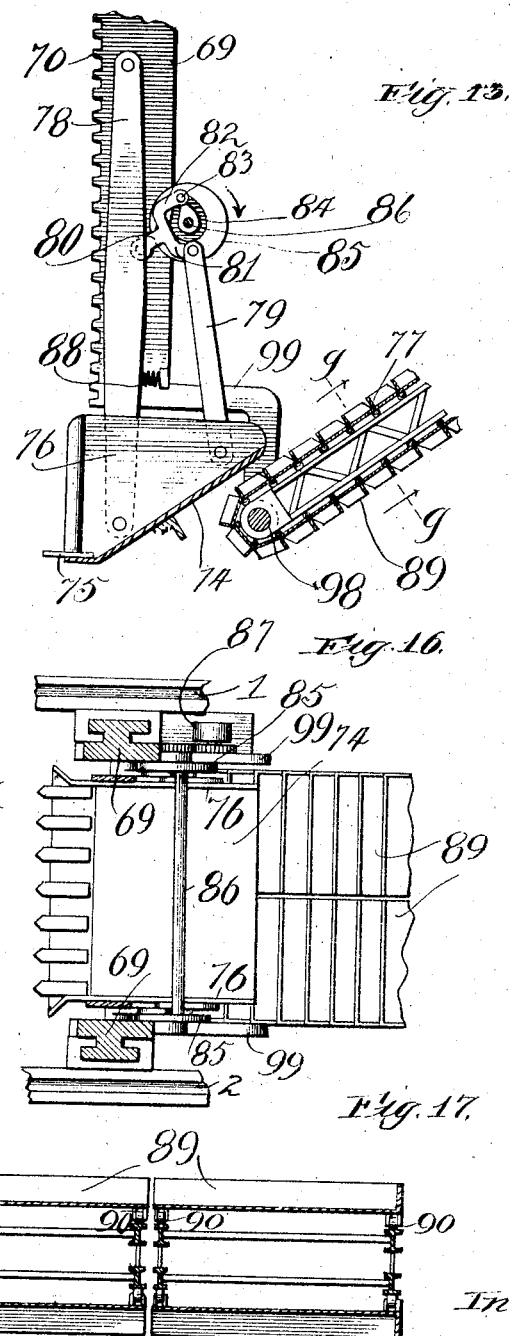

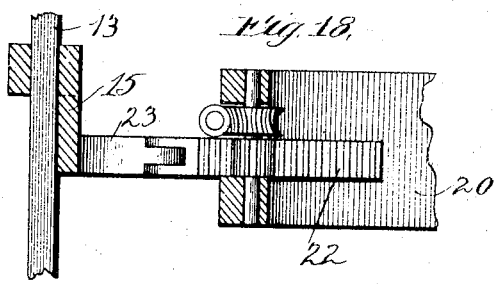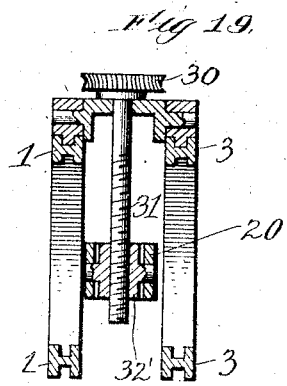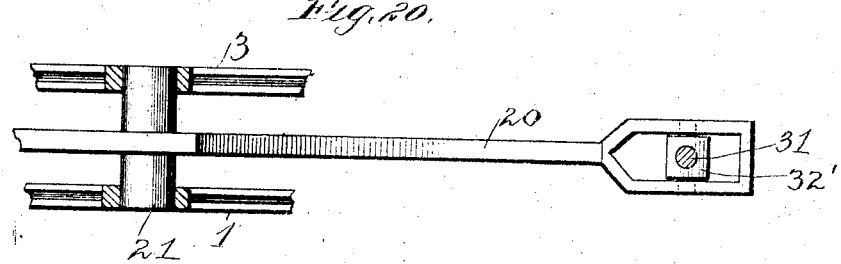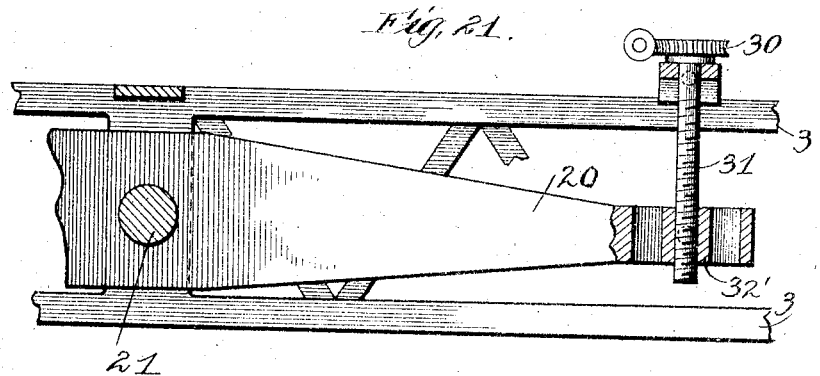

form feed

UNITED STATES PATENT OFFICE.

CHARLES L. LILLEBERG, OF CHICAGO, ILLINOIS.

EXCAVATING-MACHINE.

990,487.

Specification of Letters Patent. Patented Apr. 25, 1911.

Application filed June 8, 1908. Serial No. 437,244.

*To all whom it may concern:*

Be it known that I, CHARLES L. LILLE-BERG, a citizen of the United States, residing at Chicago, in the county of Cook and State of Illinois, have invented a certain new and useful Improvement in Excavating-Machines, of which the following is a full, clear, concise, and exact description, reference being had to the accompanying drawings, forming a part of this specification.

My invention relates to excavating or dredging machines, and, in its preferred embodiment, is adapted for use both upon land and water, though there are characteristics of my invention that are adaptable for use upon land and water separately, and I do not, therefore, limit my invention to a machine which is adapted for use both upon land and water.

The machine of my invention has a great many features of novelty and utility which cannot well be explained in a general introduction, and I will, therefore, explain my invention in detail in connection with one embodiment thereof, it being particularly understood that I do not limit myself to the embodiment of my invention which I have selected for explanation.

In the drawings, showing the preferred embodiment of the invention, Figure 1 is a plan view of the front portion of an excavating machine. Fig. 2 is a plan view of the rear portion of the machine. Figs. 1 and 2 taken together being a plan view of the entire machine. Fig. 3 is a side elevation of the portion of the machine shown in Fig. 1. Fig. 4 is an elevation, partially in section, of the rear portion of the machine, the view being taken on line *a a* of Fig. 2. Fig. 5 is a sectional elevation on line *b b* of Fig. 1. Fig. 6 is a sectional elevation on line *c c* of Fig. 2. Fig. 7 is a front view of the machine on an enlarged scale as compared with the other views. Fig. 8 is a vertical sectional view of a portion of the structure illustrated in Fig. 7, Fig. 8 being taken on line *d d* of Fig. 1. Fig. 9 is a sectional elevation on line *e e* of Fig. 1, but on an enlarged scale as compared with Fig. 1. Fig. 10 is a side elevation of the central and lower portion of the structure shown in Fig. 9. Fig. 11 is a sectional elevation of a portion of the apparatus. Fig. 12 is a plan view of the apparatus shown in Fig. 11. Fig. 13 is a view on an enlarged scale of a portion of the mechanism appearing in Fig. 5. Fig. 14 is a plan view of the structure appearing in Fig. 13. Fig. 15 is a view on an enlarged scale of a lower portion of the structure appearing in Fig. 6. Fig. 16 is a plan view of the parts appearing in Fig. 5. Fig. 17 is a view on line *g g* of Fig. 15. Fig. 18 is a view on line *h h* of Fig. 1 on an enlarged scale. Fig. 19 is a cross-sectional view on line *i i* of Fig. 1. Fig. 20 is a plan view of a part of the mechanism illustrated in Fig. 1, a part of the structure appearing in Fig. 20 being taken on line *k k* of Fig. 5. Fig. 21 is a side elevation of the structural parts appearing in Fig. 20, additional structural parts being also shown in Fig. 21. Fig. 22 is an end view of the structure illustrated in Figs. 13 and 14. Fig. 23 is a view of a sprocket wheel and chain construction entering into conveyer mechanism that I preferably employ. Fig. 24 is a sectional elevation on line *l l* of Fig. 11.

Like parts are indicated by similar characters of reference throughout the different figures.

The main frame work of the machine comprises intermediate longitudinally disposed rails 1 2, the outer longitudinally disposed rails 3 4, suitably joined to the intermediate rails 1 2, as by means of struts 5 6, and transversely disposed rails 7 8 that unite the intermediate longitudinal rails 1 2. The frame elements described may be composed, if desired, of I-beams laid upon their sides, though the material of which these frame portions is made is not of the essence of my invention. I prefer I-beams, as they afford very great strength with comparatively small bulk, whereby I am enabled to provide large spaces between the frame elements that permit of the disposition and operation of the various machine elements that enter into my improved apparatus.

The machine of my invention is adapted for operation upon dry land and also when it is in the water, its operation, when within water, being substantially the same as its operation when upon dry land, except in so far as water may modify the soil conditions, and the means for supporting the machine while in operation are, therefore, the same whether or not the machine is upon dry land.

There are two traction wheels 9 9 at the forward portion of the machine taking part in the support of the main frame work thereof and the parts carried by the main frame work, and two traction wheels 10 at the rear of the machine also taking part in the support of the main frame work and the parts carried thereby. There are other traction wheels which support supplemental parts of the machine, which latter traction wheels will be described later. Each of the traction wheels 9 10 is very large in diameter and is provided with suitable traction cleats 11, in order to give the traction wheels purchase upon the soil over which they are moving. Each of the forward traction wheels is mounted to rotate upon a non-rotating journal 12 constituting the horizontal extension of a shaft 13 that is adapted for vertical movement between a pair of rollers 14. The two pairs of rollers 14 are mounted upon a yoke 15 provided with passageways through which the vertical shafts 13 may move, the yoke 15 carrying a shaft 16 which constitutes a pivotal shaft for the rocker 17 that is mounted midway between its ends upon the shaft 16. The outer ends of the rocker 17 are pivotally connected with the elbows that are constituted by the junction of the journals 12 with the vertical shafts 13. The journals or stub shafts 12 are thus adapted for bodily movement about the horizontal axis afforded by the shaft 16 carried by the yoke 15, the vertical shafts 13 working between the rollers 14 and acting in coöperation with their pivotal connections with the rocking plate 17, serving to keep the traction wheels 9 in vertical planes. By the mechanism thus described one of the wheels 9 may occupy any reasonable position higher or lower than the other of the wheels 9 without causing the removal of the wheels 9 from their vertical planes.

It will be seen by reference to the drawings that the main support for the front portion of the machine is afforded by the shaft 16 that extends longitudinally of the machine and upon which rests the rocking plate 17 that, in turn, rests upon the stub shafts or journals 12 which, in turn, rest upon the traction wheels 9, the plate 17 that takes part in the support of the forward end of the machine being mounted to swing in a vertical plane transverse to the line of travel of the machine and being pivotally connected at its outer ends with the vertically moving shafts 13, in order that the wheels 9, while acting to support the machine, may also be permitted of vertical displacement with respect to each other without impairing their function of supporting the forward end of the machine and without having said wheels removed from the vertical planes in which they should rotate.

The direction that the machine is to take is controlled by the position of the wheels 9 with respect to the main frame work of the machine, and in order that this direction may be controlled and that the wheels 9 9 may have their directions uniformly and simultaneously changed, I mount the yoke 15 so that it may move about a vertical axis, which vertical axis is desirably afforded by means of a vertical shaft 18 (Figs. 1 and 5) that passes through the yoke ears 19 and the forward end of the sub frame 20 that is normally fixed in position with respect to the main frame but whose position with respect to the main frame is rendered adjustable by means of apparatus hereinafter to be described, it sufficing for the present to state that the sub frame 20 is journaled at each of its sides upon a shaft 21 (Figs. 5, 20 and 21) that is mounted upon the main frame, whereby the sub frame 20 may be elevated or lowered at its front end, so that the position of the yoke 15 may be adjusted with respect to the main frame of the machine, whereby the forward end of the main frame may be raised or lowered with respect to the traction wheels 9, which is desirable upon relative change in the levels of the soil upon which the front wheels 9 and the rear wheels 10 rest. Suitable mechanism is provided whereby the yoke 15 may be swung about its shaft 18 irrespective of the position to which the sub frame 20 is swung upon its shafts 21; which mechanism includes rack bars 22 in suitable gear relation with driving gearing and pivotally connected with links 23 disposed between the outer ends and upper portions of the yoke 15. By the operation of suitable gearing, these rack bars 22 may be moved simultaneously, one in one direction and the other in the opposite direction, whereby the yoke 15 may be swung upon its shaft 18 so as properly to direct the traction wheels 9 in their travel.

Each of the rear traction wheels 10 is provided with an individual mounting 24 in the form of a bail, the individual supports, mounting or bails 24 being carried upon shafts 25¹ that are provided upon the main frame work of the machine, each shaft 25¹ being between the ends of the support 24. Upon the rear end of each support 24 is provided the associate traction wheel 10. At the forward end of each support 24 is provided suitable mechanism for swinging it about its supporting shaft 25¹ (which mechanism will be referred to later), whereby the position of the rear end of the main frame may be vertically determined with respect to the traction wheels 10. Thus by suitable adjustment of the frame 20 24, the level of the main frame of the machine may be maintained irrespective of the levels of the ground upon which the wheels 9 10 are rolling.

As the machine shown in the present embodiment of my invention is one of large proportions, I desirably drive the traction wheels individually, any suitable mechanism being employable for accomplishing this purpose. I have diagrammatically indicated four motors 25, one in association with each traction wheel. The motors 25 that are in association with the traction wheels 9 drive sprocket chains 26 through the medium of gearing which need not be specifically described, which sprocket chains 26 engage sprocket wheels 27 each traction wheel 9 having two such sprocket wheels between which the associate traction wheel is disposed.

A variety of mechanisms may be employed for adjusting the main frame with respect to the mountings for the traction wheels, whereby the desired level of the main frame of the machine may be maintained, that mechanism illustrated being suited to the purpose, though I do not wish to be limited thereto.

Referring now to the adjustment of the sub frame 20, I have provided a motor-driven horizontally disposed worm wheel 30 (Figs. 1, 18, 19, 20 and 21) in association with each longitudinal side of the sub frame 20, which worm wheel is provided with a vertically depending shaft 31 that is in threaded engagement with the rear end of the corresponding longitudinal side of the sub frame 20. When the work wheels 30 are motor-driven, the shafts 31 are rotated, the frame 20 being rotated in a clockwise or counter-clockwise direction according to the directions of rotation that are given to the wheels 30. I have shown but one motor 31', which turns a shaft 32 that is in driving relation with the wheels 30, one motor 31' being sufficient inasmuch as the sub frame 20 is an integral structure that is to have all of its parts moved together. The threaded engagement that is afforded between the vertical shafts 31 and the sub frame 20 is desirably afforded through the intermediation of the nuts 32' swingingly mounted upon the sub frame 20. The motor-operated mechanism for adjusting the mountings 24 of the rear wheels 10 is substantially the same as that described in connection with Figs. 1, 18, 19, 20 and 21, with the exception that a separate motor 33 is provided for each frame 24 inasmuch as said frames are to be independently regulable. These motors 33 are in gearing relation with horizontally disposed worm wheels 34 that do not depend for their driving relation with the motor 33 upon a common shaft such as the shaft 32, but which wheels 34 have an association with the frames 24 similar to the association of the wheels 30 with the longitudinal members of the sub frame 20.

It will be seen that I have provided an excavating machine including a frame work carrying machinery of the excavator, wheels carrying the frame work, a mounting interposed between the frame work and two of the wheels, which mounting is adapted to swing in a substantially vertical plane transverse to the length of the frame work, the heels having non-rotatable shafts or journals that are linked to said mounting, guiding members 13 to which said shafts or journals are attached, guides engaging said guiding members to direct the same in substantially vertical lines, whereby the planes of rotation of said two wheels are substantially maintained, a yoke supported upon said mounting and having an axis of rotation which is substantially vertical, and a connection between the yoke and the frame work adapted to swing with respect to the frame work in a plane which is substantially vertical, said connection having a union with said yoke that permits the yoke to swing with reference to said connection, and thereby with reference to the said frame work.

Before describing the apparatus that I employ for removing the soil, I will describe the instrumentalities by which the entire apparatus may be floated, in order that it may be readily moved upon the water and in order that certain objects that I have in mind, and which will later be set forth, may be fulfilled.

It is one of the objects of my invention to have the traction wheels 9 10 act as floats whenever it is desired to have the machine supported by water, to which end each of the traction wheels desirably has the construction illustrated most clearly in Fig. 8, which shows a traction wheel made with a large hollow water-tight interior. A water eduction pipe 35 leads through the stationary shaft 12 of the traction wheel that may be connected with a suitable pump 36 for the purpose of drawing water from the interior of the traction wheel and of supplying water thereto. An air vent pipe 37 is provided in communication between the interior of the wheel and the external air.

When it is desired to have the traction wheels roll upon the soil, assuming the machine to be in a body of water, the interiors of said wheels are sufficiently filled with water. When it is desired to float the machine, the water is sufficiently withdrawn from the interiors of said wheels. The side or disk walls of the hollow wheel are suitably braced apart, so that when no water is contained in said wheel the pressure of the water upon the outside of the wheel will not collapse the wheel. This stiffening desirably resides in ribs 11' made of angle-iron, which extend not only along the inner faces of the disk walls of the wheels, but also along the peripheral wall of the wheels. I also provide flotation tanks or floats 38 upon the sides of the machine, which floats are desirably in the form of air-tight compartments which may be elevated and lowered, the floats being elevated when the machine is to descend and being lowered when the machine is to be floated.

Each of the flotation tanks 38 constitutes a unit of a float structure, all of the tanks together constituting a float structure. Any suitable means may be employed for effecting the vertical movement of the flotation tanks. I have provided the flotation tanks with rack bars 39 that are adapted to be moved up and down in suitable groove-ways provided upon the sides of the main frame of the machine, these rack bars being engaged by driving pinions 40 that have stationary axes of rotation and which are driven by means of motors 41 in suitable gearing relation with the driving pinions 40. By means of the traction wheels and the flotation tanks and the mechanism coöperating therewith, I am enabled to float the structure when it is desired to transport it or to shift its position and for other purposes, and I am also enabled to cause the structure to sink sufficiently to permit the traction wheels to roll upon the soil at the water bottom. If any of the traction wheels should suddenly find no water bottom support, the flotation tanks and the wheels themselves may then serve to support the machine and prevent it from sinking.

It has been hitherto stated that the machine of my invention is to be operated upon dry land as well as in the water, and the provision of the flotation tanks 38 and the hollow traction wheels 9 does not interfere with the use of the machine upon dry land.

I term my apparatus an "excavating machine," thereby meaning that the machine is adapted for excavating operations upon dry land as well as upon water bottoms.

In the normal operation of the excavating outfit, the floats or flotation tanks 38 are in an elevated position, so that the traction wheels may rest upon the ground; but if the traction wheels or any of them should not find lodgment upon the ground, then the necessary number of flotation tanks are allowed to descend, so that the support which a traction wheel or wheels may lack is compensated for by the float mechanism. When the floats or flotation tanks are lowered, they are placed in their lower position by means of the gearing mechanism which prevents the driving pinions 40 from being operated by the floats, these driving pinions 40 being adapted for operation only by the motors. The flotation tanks are secured at their inner sides to the lower portions of the rack bars 39, the outer sides of the flotation tanks being secured to the upper portions of the rack bars by means of bracing 42.

The apparatus thus far described is one which marks a great improvement in the art of excavating machinery, and while I support excavating machinery of a novel nature upon the outfit that has been described, I do not wish to be limited in all embodiments of the invention to the character of the excavating mechanism that is carried by the described structure.

In accordance with another feature of my invention, I provide breaking mechanism for the purpose of breaking the soil, so that the soil-removing mechanism that I employ may more readily perform its function. There is preferably a plurality of independently operating breaking mechanisms, for I desire to have each breaking mechanism work within a comparatively narrow space, and by making the breaking mechanisms operate independently, difficulties encountered by one breaking mechanism are not necessarily shared by the other breaking mechanisms, whereby the soil or ground which may be broken is not prevented from being broken, because one or more of the breaking mechanisms encounter unbreakable ground. I consider it to be broadly new with me to provide these breakers for preparing the ground for the digging operation which is to follow, and in carrying out the present object of my invention, the breaking mechanisms or breakers are at the front portion of the machine and the mechanism that is provided for removing the soil that has been broken is disposed at a rear portion of the machine. I also provide grappling mechanism whereby obstacles that are not readily displaceable by the soil-removing mechanism may be removed from the path of such latter mechanism, the grappling mechanism being interposed between the breakers and the soil-removing mechanism, inasmuch as the breakers may aid in detecting the obstacles that are not readily removable by the soil-removing mechanism.

In the preferred embodiment of my invention, I employ the breaking mechanism illustrated most clearly in Figs. 13, 14 and 22 and illustrated generally in Figs. 1, 3 and 5. I have illustrated (Fig. 1) four breaking mechanisms or breakers located abreast and placed between the longitudinal sides 1 2 of the main frame, though I do not wish to be limited to the number of breakers that are employed. Each of these breakers includes a pair of arms 43 whose lower ends are provided with downwardly extending hooks 44 that have a common claw 45 which is made of hard steel and is detachably secured between the parallel members of the hooks 44. A link 46 is pivotally disposed between each pair of arms 43 and is connected at its upper end to a vertically movable frame work 47, the purpose of which frame will be more fully hereinafter set forth. A pair of spur gear wheels 48 is associated with each pair of arms 43, these gear wheels 48 being also carried by the aforesaid frame 47. Each pair of gear wheels 48 is in mesh with a pinion 49 common thereto, which pinion is driven by a motor 50, there being preferably one motor for each pinion 49, in order that the breakers may be individually controlled. The gearing which I have illustrated is more for the sake of rendering clear the operation of my machine, though it is obvious that the nature of the gearing may be changed to suit individual circumstances, and this is true with respect to all of the gearing shown in the apparatus. When the breakers are in operation, the points of the claws 45 are caused to follow the path indicated by the dotted line 51 in Fig. 13, the direction in which the points of the claws 45 travel being indicated by the arrows placed close to said line 51. The breakers are thus caused to act somewhat as picks, thereby effectively loosening and breaking all ground that is adapted to be broken, preparing the same for removal by the ground-removing mechanism which will later be described and which is located at the rear of the machine. By causing the points of the claws 45 to travel as indicated, not only may the ground be broken, but the forward progress of the entire machine will thereby be assisted. If it should happen that one or more of the breakers should encounter material too refractory to be broken, such as heavy rocks, the said breaker or breakers simply resist the motors 50, which are so related to the breakers that they are capable of normally operating the breakers but will not rupture the breakers if said breakers encounter material that is too refractory. Moreover, the workman who attends to the breakers will immediately notice any abnormal operating condition thereof, and will stop the operation of the associate motors, or otherwise remove driving power from the breakers. The obstacle encountered may be such that it can be removed by repeated efforts of the breakers, and to this end the driving motors of the breakers engaging the obstacle may be reversed to reverse the operation of the claws 45.

The frame work 47 constituting the carrier for the breakers, the operating gearing 48 49 and the motors 50, is adapted for vertical movement within suitable guides, so that the breakers may be adjusted to suit the level of the ground over which the machine is operating. For this purpose I provide a motor 52 whose shaft 53 operates gearing 54 that couples the shaft 53 in driving relation with rack bars 55 carried by the frame 47. If the obstacle encountered by a breaker or breakers is too heavy to be removed by the soil-removing mechanism, or is not dislodgeable by the breakers, I then have recourse to grappling mechanism which is normally out of operation but which is adapted to be moved to different parts of the machine, in order that it may be effective to remove the obstacle and to discharge the same out of the path of the soil-removing mechanism. This grappling mechanism is desirably of the construction illustrated most clearly in Fig. 9 and generally shown in Figs. 1, 3 and 5. It includes a rack beam 56 that is adapted to be moved vertically by means of gearing 57 that is interposed between the rack beam 56 and a motor 58. At the lower end of the beam 56 is provided a pair of grappling jaws 59 that are hinged to the beam. These grappling jaws may be of any well known type and may be operated in any well known way. I have indicated, for sake of illustration, operating cables 60 that pass over suitable sheaves and are suitably coupled with the grappling jaws as to effect their operation, these cables being passed over winding drums 61 that are operated by motors 62. The beam 56 passes through the floor 63 of a truck, which floor also supports a guide 64, the floor 63 and guide 64 confining the beam 56 to vertical movement. The truck of which the floor 63 forms a part has wheels 65 that ride upon tracks 66 that extend transversely of the main frame work, whereby said truck may be moved cross-wise of the machine to enable the grappling jaws 59 to be moved from side to side of the machine. The laterally disposed tracks 66, in turn, are carried upon a truck 67 that is provided with wheels 68 that may roll upon the longitudinal rails 1 2 extending lengthwise and forming a part of the main frame. By the provision of this latter truck, the grapplers may be moved lengthwise of the machine, the forward limit of travel being determined by the frame work 47, while the extent to which the grapplers may be moved to the rear is determined by means of the transversely disposed frame member 8 located at the rear of the machine. The extent to which the grappling mechanism may travel longitudinally upon the machine is sufficient to enable it to do its ordinary work without modifying the progress of the excavating outfit. When the grappling jaws are in vertical line with the obstacle that is to be removed, they are lowered, the obstacle is grappled, and the grappling jaws are then raised, whereafter the obstacle is carried by the grappling jaws and discharged at a place out of line with the soil-removing mechanism.

The soil-removing mechanism that I employ preferably is of the kind illustrated most clearly in Figs. 15, 16 and 17 and illustrated generally in Figs. 2, 4 and 6. In the particular soil-removing mechanism that I have illustrated, but to which I do not wish to be limited in all embodiments of the invention, I employ a movable frame 69 that is provided with vertically disposed racks 70 which may be engaged by driving pinions 71 that are operated by a shaft 72 driven by a motor 73 in gear with said shaft 72. By means of the pinions 71 the frame 69 may be moved vertically to determine the position of the shovel 74 with respect to the soil. The nose of the shovel is margined by a number of horizontally disposed teeth 75 that are worked within the soil, while the portion of the shovel blade to the rear of the teeth 75 is upwardly inclined. The shovel has side walls 76, so as to constitute, with the sloping bottom of the shovel, a channel through which the soil is passed in the process of its removal, the rear of the shovel being open so that the soil may pass therefrom and be deposited upon a conveyer 77 leading to a suitable point of discharge hereinafter to be more particularly described. The shovel 74 is agitated in order that it may dislodge the soil, this agitation being desirable inasmuch as the bodily travel of the entire apparatus is comparatively slow. To this end, I connect the portion of the shovel near its teeth with the movable frame 69 by means of links 78 that are pivotally connected at their upper ends with vertical members of the frame 69 and are pivotally connected at their lower ends near the nose or bottom of the shovel 74. The upper and rear portion of the shovel 74 is pivotally connected with links 79 to which oscillating motion is imparted at their upper ends by some suitable mechanism, preferably that illustrated most clearly in Fig. 15, wherein I have shown a forked lever (there being one for each link 79) whose stem 80 is pivotally connected with the frame work 69, one of the branches 81 of the fork being connected with the upper end of the associate link 79 while the other branch 82 of the fork carries a cam relation 83 that travels within a cam-way or groove 84 provided in a rotating cam structure 85. The cam structures 85 are fixed upon a shaft 86 common to the cam structures, which cam is driven by a motor 87 in gearing relation with said shaft. It will be observed that the cam structures 85 rotate, as viewed in Fig. 15, in a clockwise direction, the cam-ways 84 being so shaped that the upper and rear end of the shovel is elevated gradually and is permitted to descend suddenly.

By means of the structure that has been described, the upper and rear portion of the shovel has greater range of movement than does the nose portion of the shovel, where the movement is almost nil owing to the close proximity of the pivotal connection of the links 80 with the sides of the shovel. The links 80 are backed by heavy springs 88 that normally hold the links 80 stationary with respect to the frame 69, and therefore, afford a pivotal connection for the shovel 74 with the frame 69 that is normally stationary with respect to said frame, the links 79 oscillating the shovel about this pivotal connection. It sometimes happens that material is encountered by the shovel that does not readily yield to the shoveling action, and in order to prevent the shovel structure from becoming broken, I provide the heavy springs 88 in order that the shovel may yield when it encounters superior resistance.

As has been stated, the floor of the shovel is in the main inclined with respect to the horizontal, the soil that is being removed by the shovel passing upwardly upon the inclined bottom of the shovel and through the open upper rear end of the shovel, whence it may be deposited upon a suitable conveyer, preferably that illustrated clearly in Figs. 2, 4, 6, 15, 16, 17 and 23. The conveyer shown in these figures is preferably formed of symmetrically arranged duplicated structures, as appears most clearly in Figs. 16 and 17. Each of these duplicated structures includes a group of buckets 89 that are linked together in an endless chain, the buckets in the upper stretch of the conveyer, which moves toward the rear of the machine, opening toward the rear of the machine. These buckets are provided with wheels 90 that roll upon tracks 91 that terminate short of the ends of the bucket chain. At the ends of each bucket chain I provide a sprocket wheel 92, such as that indicated in Fig. 23, with which sprocket chains 94 (suitably coupled with the buckets 89) engage. The lower sprocket wheels are passive, the upper sprocket wheels being motor-driven, in order to effect the travel of the conveyer bucket chain, there being illustrated in Fig. 2 a motor 95 that is in gear relation with a shaft 96 upon which the upper sprocket wheels for both bucket chains are mounted. In Fig. 17 I have indicated two sprocket chains 97 for each bucket chain that includes the buckets 89, these sprocket chains 97 engaging the sprocket wheels. The links of the sprocket chains do not desirably directly engage the sprocket wheels 92, the driving relation between the sprocket chains and the sprocket wheels being preferably afforded by means of the wheels 90 that are co-axial with the pivotal connections between the links of the sprocket chains and which wheels 90 serve to support the buckets 89, the said wheels 90 rolling upon the tracks 91 for this purpose. The upper stretches of the bucket chains move upwardly toward the rear of the machine in order to discharge the soil that has been removed by the shaft and which has become deposited upon the bucket chains.

It is desirable to maintain approximately a given relation between the bucket chains that have been described and the shovel 74, to which end I journal the lower shaft 98 upon arms 99 that extend rearwardly and downwardly from the frame 69, so that as said frame 69 is moved vertically, the shaft 98 correspondingly moves vertically. Inasmuch as stiff rails 91 are employed, I provide means whereby the upper sprocket shaft 96 may be moved horizontally, to which end the bearing 101 for the shaft 96 is adapted to slide longitudinally of the machine in suitable horizontal guide-ways 102.

It is obvious to those skilled in the art that a variety of ways may be afforded for disposing of the soil that is discharged by the bucket chains that have been described, though in the practicing of my invention I prefer the mechanism illustrated for disposing of the soil conveyed by said bucket chains. This mechanism of my preferment is illustrated in Figs. 2, 4, 6, 11 and 12, where I have shown bucket chains 103 that are similar in construction to the bucket chains leading upwardly from the shovel 74. The bucket chains 103 are desirably of considerable length, so that they may reach an adjacent bank, and in view of the material length of these bucket chains 103 I desirably provide a vehicle for supporting a portion thereof removed from the main machine. The vehicle which supports an outer portion of the chains 103 is desirably of such a nature that it not only may travel upon an adjacent shore, but may also be supported by a body of water in which the entire machine is disposed. This vehicle is desirably of the construction illustrated most clearly in Figs. 11 and 12, where I have shown a general frame work 104 that carries bolster pins 105 at its ends, which bolster pins afford vertical axes of rotation for trucks 106 that are provided with traction wheels 107 which preferably have the same construction as that illustrated in Fig. 8, whereby these traction wheels may upon occasion buoy the outer portions of the bucket chains 103, as, for example, when the entire machine is in water. It is particularly desirable to have the wheels 107 act as floats, for it is not so important to have these wheels 107 run upon the ground when the entire machine is in water, although it is very desirable to have the wheels 9 10 roll upon the ground when this is practicable. While the structure of the wheels 107 is preferably that which has been specified, I preferably provide means for adjusting the vertical positions of these wheels that differ from the adjusting mechanisms for the wheels 9 10. To this end, I mount the shaft 108 for each wheel 107 upon a pair of arms 109 that are journaled at their upper ends to a portion of the truck 106. The lower end of each of the arms 109 terminates in a segmental rack 110 that is in engagement with a worm shaft 111 that is driven by a motor 112 in suitable gear relation with the worm shaft 111. By rotation of the worm shafts 111, the lower ends of the arms 109 may be moved up or down, thereby to adjust the positions of the wheels 107 vertically. To permit of this movement of the arms 109 and the shaft 108, the side walls of the truck 106 are provided with slots 113 that are concentric with the axes of rotation of the arms 109, along which slots the shafts 108 may be moved. When the wheels 107 are to act as traction wheels, they are driven by sprocket chains 114 that pass over sprocket wheels 115 fixed with relation to the wheels 107 and sprocket wheels 116 concentric with the axes of rotation of the arms 109, the sprocket wheels 116 being driven by motors 117 that are in gear relation with the sprocket wheels 116, the motors 117 being carried upon the trucks 106.

The frame work 103 carries a motor 118 that is in suitable gear relation with shafting formed in sections 119, 120, 121, 122 and 123, which shaft sections are geared together by means of miter gears 124. The shaft sections 119, 123 carry worm shafts 125 126 that are in gear relation with worm wheels 127 128 that are fixed with respect to pinions 129 130 that are in mesh with gear wheels 131 132 that are concentric with the bolster pins 105 and which rotate about said bolster pins. The gear wheels 131 132 are fixed with respect to the trucks 106, whereby as the pinions 129 130 are rotated, said trucks 106 are rotated about their bolster pins, whereby the rotary positions of said trucks are determined and the planes of rotation of the wheels 107 are selected, so that said wheels 107 are caused to have a line of travel parallel with the line of travel of the main machine, irrespective of the angle that the bucket chains 103 have to the main machine, it being another feature of my invention to have the angular position of the bucket chains 103 regulable with respect to the main machine. By means of the preferred embodiment of the latter feature of my invention, I am enabled to swing the bucket chain 103 throughout an angle somewhat in excess of one hundred eighty degrees, so that said bucket chain may extend laterally on one side of the main machine or the other side of the main machine as desired, or may be caused to trail behind the machine and may occupy various positions between the extreme limits of the swing of the bucket chain 103 as may be desired, the rotating trucks 106, as hitherto stated, permitting the wheels 107 to travel in a line parallel with the line of travel of the main machine irrespective of the angular position of the bucket chain 103.

In the preferred embodiment of the invention, the bearing 101 that supports the shaft for the sprocket wheels at the upper end of the bucket chain 89 is an integral part of a bracket 133 that affords a horizontal shelf 134 to support the inner end of the bucket chain 103, this inner end of the bucket chain 103 being desirably located just to the rear of the bucket chain 89 and beneath the same, so that the material conveyed by the chain 89 may be dropped upon the chain 103. A bracket 135 supports a shaft 136 that carries four sprocket wheels which are in driving relation with the chains 103, the relationship of the chains 103 to these sprocket wheels being similar to the relation of the chains 89 to their driving sprocket wheels which has been described. The shaft 136 is driven by a sprocket chain 137 that is, in turn, driven by a shaft 138 driven by a motor 139 in suitable gear relation with the shaft 138. The outer end of the chains 103 is positively driven as well as the inner ends of said chains, a sprocket chain 140 driven by the shaft 138 being in driving relation with a shaft 141 at the outer end of the chains 103 through the agency of sprocket wheels engaging the chains 103, as will be well understood. The bracket 135 at the inner ends of the chains 103 has a ball and socket connection 142 with the bracket arm 134, whereby the bracket 135 may be swung to permit the chains 103 to occupy angular positions with respect to the main frame of the machine or to permit the chains 103 to trail behind the main frame of the machine and also to permit the chains 103 to be tilted at varying angles within suitable limits to permit the wheels 107 to rise and fall according to the level of the ground upon which they roll. The grappling mechanism may reach the conveyer 103 in all of the positions of said conveyer, so as to deposit upon said conveyer the material removed by the grappling mechanism from the path of the shovel mechanism.

When it is desired to change the angular relation of the bucket chains 103 with respect to the main frame of the machine, such change may be effected by varying the speed of the wheels 107 with respect to the speed of the main traction wheels 9, 10, it being understood that the trucks 106 are simultaneously turned in order that the wheels 107 may be adapted to the new lines of travel that they are caused to follow in shifting the chains 103 and to carry said chains when in their new position. These operations may be accomplished without putting undue stress upon the ball joint 142. On occasion the wheels 107 may take part in assisting the entire outfit in its progress, particularly if the conveying mechanism 103 trails behind the outfit.

It should be said in passing that the frame work 143 that supports the shafts 136 141 is rigid with respect to their supporting frame work, so that the angular relationship of the chains 103 to the frame is fixed. The frames 104 and 141, together with the parts carried thereby and associated therewith, may be provided with a vertically movable flotation tank or float 144 which is shown in Fig. 24 in its uppermost position. This flotation tank is provided with four upright rack bars 145 that are rigid with respect to the flotation tank, and by vertical movement of which the vertical position of the flotation tank with respect to the frame parts 104 and 143 may be determined. The rack bars 145 are moved vertically by means of pinions 146 that are provided upon the shafts 147 that are in suitable gear relation with the motor 148. When it is desired to lift the wheels 107, the float 144 may be lowered, the wheels 107 at the same time being sufficiently free of water upon their interiors so that the said wheels may coöperate with the float 144 in floating the frames 104 143 and the parts carried thereby. The float 144 and the wheels 107, when sufficiently free of water, also serve to support the structure under description in case the wheels 107 ride clear of supporting ground.

For sake of convenience of illustration, I have only diagramatically indicated the various motors that operate the different mechanisms, it being understood that there are several operators in charge, each having a class of work to govern. These motors may be of any suitable type. I prefer electric motors, which may be supplied with current furnished by a power plant carried by the machine, which power plant is indicated in Fig. 1, where I have diagrammatically indicated channels 149 operated by steam engines 150 which are supplied with steam from a steam source which need not be indicated. Current is led from the generators 149 to the various motors that have been mentioned.

It would make the drawings too complicated to illustrate the wiring and the various motor-controlling devices which are so well understood as to make their illustration superfluous.

It will be seen that each point of contact of the machine with the ground is in action, whereby the progress of the machine is not retarded but is promoted, there being no passive dragging parts.

An important feature of my present invention resides in the provision of the cleats 11 upon the six traction wheels that I have described, these cleats desirably being sufficiently broad so that they may act as paddles in the water to propel the machine when the traction wheels are clear of the water bottom.

The apparatus of my invention is particularly well adapted to the digging of channels that are to have uniform depths, as will be apparent from the drawings and the foregoing description.

In certain of the claims I use the term "ground" in a broad sense, meaning thereby the soil whether or not it is covered by water.

In the claims I use the term "excavating machine" in the broad sense of a machine working either upon dry land or upon a water bottom.

While I have herein shown and particularly described the preferred embodiment of my invention, I do not wish to be limited to the details of construction shown, as changes may readily be made without departing from the spirit of my invention.

Having thus described my invention, I claim as new and desire to secure by Letters Patent:—

1. An excavating machine including a frame work carrying machinery of the excavator, wheels carrying the frame work, and a float structure adapted to buoy the frame work and parts carried thereby, said wheels also serving as float structures to coöperate with the aforesaid float structure in buoying the frame work and the machinery carried thereby.

2. An excavating machine including a frame work carrying machinery of the excavator, and wheels carrying the frame work, said wheels being adapted to act as buoys or float structures to buoy the frame work and the machinery carried thereby.

3. An excavating machine including a frame work carrying machinery of the excavator, hollow wheels carrying the frame work, a float structure adapted to buoy the frame work and parts carried thereby, said wheels also serving as float structures to coöperate with the aforesaid float structure in buoying the frame work and the machinery carried thereby, and means whereby water may be passed into and removed from the said wheels.

4. An excavating machine including a frame work carrying machinery of the excavator, hollow wheels carrying the frame work, said wheels being adapted to act as buoys or float structures to buoy the frame work and the machinery carried thereby, and means whereby water may be passed into and removed from the said wheels.

5. An excavating machine including a frame work carrying machinery of the excavator, wheels carrying the frame work, a float structure adapted to buoy the frame work and parts carried thereby, and mechanism whereby the float structure may be elevated and lowered.

6. An excavating machine including a frame work carrying machinery of the excavator, wheels carrying the frame work, a float structure adapted to buoy the frame work and parts carried thereby, said wheels also serving as float structures to coöperate with the aforesaid float structure in buoying the frame work and the machinery carried thereby, and mechanism whereby the float structure may be elevated and lowered.

7. An excavating machine including a frame work carrying machinery of the excavator, hollow wheels carrying the frame work, a float structure adapted to buoy the frame work and parts carried thereby, said wheels also serving as float structures to coöperate with the aforesaid float structure in buoying the frame work and the machinery carried thereby, means whereby water may be passed into and removed from the said wheels, and mechanism whereby the float structure may be elevated and lowered.

8. An excavating machine including a frame work carrying machinery of the excavator, wheels carrying the frame work, mountings for said wheels permitting the same to occupy varying elevated positions, and mechanism for adjusting the position of said frame work with respect to the wheel mountings, whereby the position of said frame work may be adjusted with respect to the wheel mountings to compensate for varying relative vertical positions of the wheels.

9. An excavating machine including a frame work carrying machinery of the excavator, wheels carrying the frame work and movable relatively to each other vertically, and means whereby the position of the frame work with respect to the axes of rotation of the wheels may be adjusted to compensate for varying relative vertical positions of the wheels.

10. An excavating machine including a frame work carrying machinery of the excavator, wheels carrying the frame work, mountings for said wheels permitting the same to occupy varying elevated positions, mechanism for adjusting the position of said frame work with respect to the wheel mountings, whereby the position of said frame work may be adjusted with respect to the wheel mountings to compensate for varying relative vertical positions of the wheels, and mechanism whereby the axes of rotation of two of said wheels at the same end and on opposite sides of the machine may be swung in a plane substantially horizontal, whereby the direction of travel of the machine may be altered.

11. An excavating machine including a frame work carrying machinery of the excavator, wheels carrying the frame work and movable relatively to each other vertically, means whereby the position of the frame work with respect to the axes of rotation of the wheels may be adjusted to compensate for varying relative vertical positions of the wheels, and mechanism whereby the axes of rotation of two of said wheels at the same end and on opposite sides of the machine may be swung in a plane substantially horizontal, whereby the direction of travel of the machine may be altered.

12. An excavating machine including a frame work carrying machinery of the excavator, wheels carrying the frame work, mechanism whereby said wheels may be moved vertically with respect to each other, and mechanism whereby the axes of rotation of two of said wheels at the same end and on opposite sides of the machine may be swung in a plane substantially horizontal, whereby the direction of travel of the machine may be altered.

13. An excavating machine including a frame work carrying machinery of the excavator, wheels carrying the frame work, two of said wheels having independently vertically adjustable mountings, and mechanism whereby the axes of rotation of two of said wheels at the same end and on opposite sides of the machine may be swung in a plane substantially horizontal, whereby the direction of travel of the machine may be altered.

14. An excavating machine including a frame work carrying machinery of the excavator, four wheels carrying the frame work, two of said wheels having independently vertically adjustable mountings, and mechanism whereby the axes of rotation of two of said wheels at the same end and on opposite sides of the machine may be swung in a plane substantially horizontal, whereby the direction of travel of the machine may be altered.

15. An excavating machine including a frame work carrying machinery of the excavator, four wheels carrying the frame work, two wheels being upon each side of the frame work, the two rear wheels having independently vertically adjustable mountings, and mechanism whereby the axes of rotation of two of said wheels at the same end and on opposite sides of the machine may be swung in a plane substantially horizontal, whereby the direction of travel of the machine may be altered.

16. An excavating machine including a frame work carrying machinery of the excavator, wheels carrying the frame work, two of said wheels having independently vertically adjustable swinging mountings, and mechanism whereby the axes of rotation of two of said wheels at the same end and on opposite sides of the machine may be swung in a plane substantially horizontal, whereby the direction of travel of the machine may be altered.

17. An excavating machine including a frame work carrying machinery of the excavator, four wheels carrying the frame work, two of said wheels having independently vertically adjustable swinging mountings, and mechanism whereby the axes of rotation of two of said wheels at the same end and on opposite sides of the machine may be swung in a plane substantially horizontal, whereby the direction of travel of the machine may be altered.

18. An excavating machine including a frame work carrying machinery of the excavator, four wheels carrying the frame work, two wheels being upon each side of the frame work, the two rear wheels having independently vertically adjustable swinging mountings, and mechanism whereby the axes of rotation of two of said wheels at the same end and on opposite sides of the machine may be swung in a plane substantially horizontal, whereby the direction of travel of the machine may be altered.

19. An excavating machine including a frame work carrying machinery of the excavator, wheels carrying the frame work, mountings for said wheels permitting the same to occupy varying elevated positions, mechanism for adjusting the position of said frame work with respect to the wheel mountings, whereby the position of said frame work may be adjusted with respect to the wheel mountings to compensate for varying relative vertical positions of the wheels, and mechanism whereby the axes of rotation of the two front wheels may be swung in a plane substantially horizontal, whereby the direction of travel of the machine may be altered.

20. An excavating machine including a frame work carrying machinery of the excavator, wheels carrying the frame work and movable relatively to each other vertically, means whereby the position of the frame work with respect to the axes of rotation of the wheels may be adjusted to compensate for varying relative vertical positions of the wheels, and mechanism whereby the axes of rotation of the two front wheels may be swung in a plane substantially horizontal, whereby the direction of travel of the machine may be altered.

21. An excavating machine including a frame work carrying machinery of the excavator, wheels carrying the frame work, mechanism whereby said wheels may be moved vertically with respect to each other, and mechanism whereby the axes of rotation of the two front wheels may be swung in a plane substantially horizontal, whereby the direction of travel of the machine may be altered.

22. An excavating machine including a frame work carrying machinery of the excavator, wheels carrying the frame work, two of said wheels having independently vertically adjustable mountings, and mechanism whereby the axes of rotation of the two front wheels may be swung in a plane substantially horizontal, whereby the direction of travel of the machine may be altered.

23. An excavating machine including a frame work carrying machinery of the excavator, four wheels carrying the frame work, two of said wheels having independently vertically adjustable mountings, and mechanism whereby the axes of rotation of the two front wheels may be swung in a plane substantially horizontal, whereby the direction of travel of the machine may be altered.

24. An excavating machine including a frame work carrying machinery of the excavator, four wheels carrying the frame work, two wheels being upon each side of the frame work, the two rear wheels having independently vertically adjustable mountings, and mechanism whereby the axes of rotation of the two front wheels may be swung in a plane substantially horizontal, whereby the direction of travel of the machine may be altered.

25. An excavating machine including a frame work carrying machinery of the excavator, wheels carrying the frame work, two of said wheels having independently vertically adjustable swinging mountings, and mechanism whereby the axes of rotation of the two front wheels may be swung in a plane substantially horizontal, whereby the direction of travel of the machine may be altered.

26. An excavating machine including a frame work carrying machinery of the excavator, four wheels carrying the frame work, two of said wheels having independently vertically adjustable swinging mountings, and mechanism whereby the axes of rotation of the two front wheels may be swung in a plane substantially horizontal, whereby the direction of travel of the machine may be altered.

27. An excavating machine including a frame work carrying machinery of the excavator, four wheels carrying the frame work, two wheels being upon each side of the frame work, the two rear wheels having independently vertically adjustable swinging mountings, and mechanism whereby the axes of rotation of the two front wheels may be swung in a plane substantially horizontal, whereby the direction of travel of the machine may be altered.

28. An excavating machine including a frame work carrying machinery of the excavator, wheels carrying the frame work, mountings for said wheels permitting the same to occupy varying elevated positions, mechanism for adjusting the position of said frame work with respect to the wheel mountings, whereby the position of said frame work may be adjusted with respect to the wheel mountings to compensate for varying relative vertical positions of the wheels, and means for shifting a wheel axis in a plane substantially horizontal, whereby the direction of travel of the machine may be altered.

29. An excavating machine including a frame work carrying machinery of the excavator, wheels carrying the frame work and movable relatively to each other vertically, means whereby the position of the frame work with respect to the axes of rotation of the wheels may be adjusted to compensate for varying relative vertical positions of the wheels, and means for shifting a wheel axis in a plane substantially horizontal, whereby the direction of travel of the machine may be altered.

30. An excavating machine including a frame work carrying machinery of the excavator, wheels carrying the frame work, mechanism whereby said wheels may be moved vertically with respect to each other, and means for shifting a wheel axis in a plane substantially horizontal, whereby the direction of travel of the machine may be altered.

31. An excavating machine including a frame work carrying machinery of the excavator, wheels carrying the frame work, two of said wheels having independently vertically adjustable mountings, and means for shifting a wheel axis in a plane substantially horizontal, whereby the direction of travel of the machine may be altered.

32. An excavating machine including a frame work carrying machinery of the excavator, four wheels carrying the frame work, two of said wheels having independently vertically adjustable mountings, and means for shifting a wheel axis in a plane substantially horizontal, whereby the direction of travel of the machine may be altered.

33. An excavating machine including a frame work carrying machinery of the excavator, four wheels carrying the frame work, two wheels being upon each side of the frame work, the two rear wheels having independently vertically adjustable mountings, and means for shifting a wheel axis in a plane substantially horizontal, whereby the direction of travel of the machine may be altered.

34. An excavating machine including a frame work carrying machinery of the excavator, wheels carrying the frame work, two of said wheels having independently vertically adjustable swinging mountings, and means for shifting a wheel axis in a plane substantially horizontal, whereby the direction of travel of the machine may be altered.

35. An excavating machine including a frame work carrying machinery of the excavator, four wheels carrying the frame work, two of said wheels having independently vertically adjustable swinging mountings, and means for shifting a wheel axis in a plane substantially horizontal, whereby the direction of travel of the machine may be altered.

36. An excavating machine including a frame work carrying machinery of the excavator, four wheels carrying the frame work, two wheels being upon each side of the frame work, the two rear wheels having independently vertically adjustable swinging mountings, and means for shifting a wheel axis in a plane substantially horizontal, whereby the direction of travel of the machine may be altered.

37. An excavating machine including a frame work carrying machinery of the excavator, wheels carrying the frame work, and a mounting interposed between the frame work and two of the wheels, which mounting is adapted to swing in a substantially vertical plane transverse to the length of the frame work, said mounting being supported by two of said wheels.

38. An excavating machine including a frame work carrying machinery of the excavator, wheels carrying the frame work, and a mounting interposed between the frame work and two of the wheels, which mounting is adapted to swing in a substantially vertical plane transverse to the length of the frame work, the wheels having non-rotatable shafts or journals that are linked to said mounting.

39. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, guiding members 13 to which said shafts or journals are attached, and guides engaging said guiding members to direct the same in substantially vertical lines, whereby the planes of rotation of said two wheels are substantially maintained.

40. An excavating machine including a frame work carrying machinery of the excavator, wheels carrying the frame work, a mounting interposed between the frame work and two of the wheels, which mounting is adapted to swing in a substantially vertical plane transverse to the length of the frame work, said mounting being supported by two of said wheels, and a yoke connected with the frame work and supported upon said mounting and having an axis of rotation which is substantially vertical.

41. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, and a yoke connected with the frame work and supported upon said mounting and having an axis of rotation which is substantially vertical.

42. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, guiding members 13 to which said shafts or journals are attached, guides engaging said guiding members to direct the same in substantially vertical lines, whereby the planes of rotation of said two wheels are substantially maintained, and a yoke connected with the frame work and supported upon said mounting and having an axis of rotation which is substantially vertical.

43. An excavating machine including a frame work carrying machinery of the excavator, wheels carrying the frame work, a mounting interposed between the frame work and two of the wheels, which mounting is adapted to swing in a substantially vertical plane transverse to the length of the frame work, said mounting being supported by two of said wheels, a yoke supported upon said mounting and having an axis of rotation which is substantially vertical, and a connection between the yoke and the frame work adapted to swing with respect to the frame work in a plane which is substantially vertical.

44. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, a yoke supported upon said mounting and having an axis of rotation which is substantially vertical, and a connection between the yoke and the frame work adapted to swing with respect to the frame work in a plane which is substantially vertical.

45. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, guiding members 13 to which said shafts or journals are attached, guides engaging said guiding members to direct the same in substantially vertical lines, whereby the planes of rotation of said two wheels are substantially maintained, a yoke supported upon said mounting and having an axis of rotation which is substantially vertical, and a connection between the yoke and the frame work adapted to swing with respect to the frame work in a plane which is substantially vertical.

46. An excavating machine including a frame work carrying machinery of the excavator, wheels carrying the frame work, a mounting interposed between the frame work and two of the wheels, which mounting is adapted to swing in a substantially vertical plane transverse to the length of the frame work, said mounting being supported by two of said wheels, a yoke supported upon said mounting and having an axis of rotation which is substantially vertical, and a connection between the yoke and the frame work adapted to swing with respect to the frame work in a plane which is substantially vertical, said connection having a union with said yoke that permits the yoke to swing with reference to said connection, and thereby with reference to the said frame work.

47. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, a yoke supported upon said mounting and having an axis of rotation which is substantially vertical, and a connection between the yoke and the frame work adapted to swing with respect to the frame work in a plane which is substantially vertical, said connection having a union with said yoke that permits the yoke to swing with reference to said connection, and thereby with reference to the said frame work.

48. An excavating machine including a frame work carrying machinery of the excavator, wheels carrying the frame work, a mounting interposed between the frame work and two of the wheels, which mounting is adapted to swing in a substantially vertical plane transverse to the length of the frame work, the wheels having non-rotatable shafts or journals that are linked to said mounting, guiding members 13 to which said shafts or journals are attached, guides engaging said guiding members to direct the same in substantially vertical lines, whereby the planes of rotation of said two wheels are substantially maintained, a yoke supported upon said mounting and having an axis of rotation which is substantially vertical, and a connection between the yoke and the frame work adapted to swing with respect to the frame work in a plane which is substantially vertical, said connection having a union with said yoke that permits the yoke to swing with reference to said connection, and thereby with reference to the said frame work.

49. An excavating machine including a frame work carrying machinery of the excavator, wheels carrying the frame work, said wheels being adapted to run upon the ground and having paddles whereby they may engage water to propel the machine, and means for effecting the rotation of said wheels.

50. An excavating machine including a frame work carrying machinery of the excavator, wheels carrying the frame work, said wheels being adapted to run upon the ground and having paddles whereby they may engage water to propel the machine, and means for effecting the rotation of said wheels, said wheels being adapted to act as float structures, thereby to aid in the support of the frame work upon the water.

51. An excavating machine including a frame work carrying machinery of the excavator, hollow wheels carrying the frame work, whereby said wheels may act as float structures to take part in the support of the frame work upon water, said wheels being adapted to run upon the ground and having paddles whereby they may engage water to propel the machine, and means for effecting the rotation of said wheels.

52. An excavating machine including a frame work carrying machinery of the excavator, hollow wheels carrying the frame work, whereby said wheels may act as float structures to take part in the support of the frame work upon water, said wheels being adapted to run upon the ground and having paddles whereby they may engage water to propel the machine, means for effecting the rotation of said wheels, and means whereby water may be placed within and withdrawn from the wheels.

53. An excavating machine including a frame work carrying machinery of the excavator, and wheels carrying the frame work, said wheels being hollow, thereby to enable them to act as float structures to aid in the support of the frame work upon water.

54. An excavating machine including a supporting frame work, and mechanism for breaking the ground preparatory to its removal, said breaking mechanism including a plurality of independently operating breakers.

55. An excavating machine including a supporting frame work, and vertically adjustable mechanism for breaking the ground preparatory to its removal, said breaking mechanism including a plurality of independently operating breakers.

56. An excavating machine including a supporting frame work, and mechanism for breaking the ground preparatory to its removal, said breaking mechanism including a plurality of independently operating breakers, each of said breakers having claws that have breaking action upon the ground.

57. An excavating machine including a supporting frame work, and vertically adjustable mechanism for breaking the ground preparatory to its removal, said breaking mechanism including a plurality of independently operating breakers, each of said breakers having claws that have breaking action upon the ground.

58. The combination with a frame work, of a breaker carried thereby, said breaker being composed of an oscillating arm 43 having a breaking extremity 45.

59. The combination with a frame work, of a breaker carried thereby, said breaker being composed of an oscillating arm 43 having a breaking extremity 45, and means whereby the breaker may be vertically adjusted with respect to the frame work.

60. The combination with a frame work, of a breaker carried thereby, said breaker including an arm 43 having a digging extremity 45, a link 46 whereby said arm is carried by the frame work, and means for imparting turning movement to a portion of the arm, between which portion and said digging extremity said link is disposed.

61. The combination with a frame work, of a breaker carried thereby, said breaker including an arm 43 having a digging extremity 45, a link 46 whereby said arm is carried by the frame work, means for imparting turning movement to a portion of the arm, between which portion and said digging extremity said link is disposed, and a carrier or frame for the said parts of the breaker which may be elevated and lowered with respect to the frame.

62. An excavating machine including a frame work, breaking mechanism, and grappling mechanism serving to remove obstacles encountered by the breaking mechanism.

63. An excavating machine including a frame work, breaking mechanism, grappling mechanism serving to remove obstacles encountered by the breaking mechanism, and a vehicle for the grappling mechanism, whereby it may travel longitudinally of the excavating machine.

64. An excavating machine including a frame work, breaking mechanism, grappling mechanism serving to remove obstacles encountered by the breaking mechanism, a vehicle for the grappling mechanism, whereby it may travel longitudinally of the excavating machine, and a second vehicle for the grappling mechanism, whereby it may travel transversely of the machine.

65. An excavating machine including a frame work, breaking mechanism, grappling mechanism serving to remove obstacles encountered by the breaking mechanism, and soil-removing mechanism for disposing of the ground or soil broken by the breaking mechanism.

66. An excavating machine including a frame work, breaking mechanism, grappling mechanism serving to remove obstacles encountered by the breaking mechanism, a vehicle for the grappling mechanism, whereby it may travel longitudinally of the excavating machine, and soil-removing mechanism for disposing of the ground or soil broken by the breaking mechanism.

67. An excavating machine including a frame work, breaking mechanism, grappling mechanism serving to remove obstacles encountered by the breaking mechanism, a vehicle for the grappling mechanism, whereby it may travel longitudinally of the excavating machine, a second vehicle for the grappling mechanism, whereby it may travel transversely of the machine, and soil-removing mechanism for disposing of the ground or soil broken by the breaking mechanism.

68. An excavating machine including a frame work, soil-removing mechanism carried thereby, said soil-removing mechanism including a shovel having a bottom inclined with respect to the horizontal, and mechanism for agitating the shovel.

69. An excavating machine including a frame work, soil-removing mechanism carried thereby, said soil-removing mechanism including a shovel having a bottom inclined with respect to the horizontal, and mechanism for agitating the shovel, said mechanism serving to move the upper and rear or discharge end of the shovel more violently than the nose of the shovel.

70. An excavating machine including a frame work, a shovel for removing soil pivotally supported by the frame work near the nose of the shovel, and mechanism for raising and lowering the rear or discharge end of the shovel.

71. An excavating machine including a frame work, a shovel for removing soil pivotally supported by the frame work near the nose of the shovel, a link 79 connected at one end with the rear or discharge end of the shovel, and means for causing the other end of said link to follow a suitable line of travel, whereby the upper or discharge end of the shovel is agitated.

72. An excavating machine including a frame work, soil-removing mechanism carried thereby, said soil-removing mechanism including a shovel having a bottom inclined with respect to the horizontal, mechanism for agitating the shovel, the pivotal connection of the shovel with the frame work being afforded by link mechanism 78, and spring cushions 88 interposed between said link mechanism and the frame work, whereby the shovel may yield when encountering superior resistance.

73. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, the pivotal connection of the shovel with the frame work being afforded by link mechanism 78, and spring cushions 88 interposed between said link mechanism and the frame work, whereby the shovel may yield when encountering superior resistance.

74. An excavating machine including a frame work, a shovel for removing soil pivotally supported by the frame work near the nose of the shovel, mechanism for raising and lowering the rear or discharge end of the shovel, the pivotal connection of the shovel with the frame work being afforded by link mechanism 78, and spring cushions 88 interposed between said link mechanism and the frame work, whereby the shovel may yield when encountering superior resistance.

75. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, the pivotal connection of the shovel with the frame work being afforded by link mechanism 78, and spring cushions 88 interposed between said link mechanism and the frame work, whereby the shovel may yield when encountering superior resistance.

76. An excavating machine including a frame work, soil-removing mechanism carried thereby, said soil-removing mechanism including a shovel having a bottom inclined with respect to the horizontal, mechanism for agitating the shovel, and means whereby the shovel may be raised and lowered with respect to said frame work.

77. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, and means whereby the shovel may be raised and lowered with respect to said frame work.

78. An excavating machine including a frame work, a shovel for removing soil pivotally supported by the frame work near the nose of the shovel, mechanism for raising and lowering the rear or discharge end of the shovel, and means whereby the shovel may be raised and lowered with respect to said frame work.

79. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, and means whereby the shovel may be raised and lowered with respect to said frame work.

80. An excavating machine including a frame work, soil-removing mechanism carried thereby, said soil-removing mechanism including a shovel having a bottom inclined with respect to the horizontal, mechanism for agitating the shovel, the pivotal connection of the shovel with the frame work being afforded by link mechanism 78, spring cushions 88 interposed between said link mechanism and the frame work, whereby the shovel may yield when encountering superior resistance, and means whereby the shovel may be raised and lowered with respect to said frame work.

81. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, the pivotal connection of the shovel with the frame work being afforded by link mechanism 78, spring cushions 88 interposed between said link mechanism and the frame work, whereby the shovel may yield when encountering superior resistance, and means whereby the shovel may be raised and lowered with respect to said frame work.

82. An excavating machine including a frame work, a shovel for removing soil pivotally supported by the frame work near the nose of the shovel, mechanism for raising and lowering the rear or discharge end of the shovel, the pivotal connection of the shovel with the frame work being afforded by link mechanism 78, spring cushions 88 interposed between said link mechanism and the frame work, whereby the shovel may yield when encountering superior resistance, and means whereby the shovel may be raised and lowered with respect to said frame work.

83. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, the pivotal connection of the shovel with the frame work being afforded by link mechanism 78, spring cushions 88 interposed between said link mechanism and the frame work, whereby the shovel may yield when encountering superior resistance, and means whereby the shovel may be raised and lowered with respect to said frame work.

84. An excavating machine including a frame work, soil-removing mechanism carried thereby, said soil-removing mechanism including a shovel having a bottom inclined with respect to the horizontal, mechanism for agitating the shovel, and a conveyer disposed to the rear of the shovel upon which the soil discharged from the shovel may fall in order to be conveyed away.

85. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, and a conveyer disposed to the rear of the shovel upon which the soil discharged from the shovel may fall in order to be conveyed away.

86. An excavating machine including a frame work, a shovel for removing soil pivotally supported by the frame work near the nose of the shovel, mechanism for raising and lowering the rear or discharge end of the shovel, and a conveyer disposed to the rear of the shovel upon which the soil discharged from the shovel may fall in order to be conveyed away.

87. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, and a conveyer disposed to the rear of the shovel upon which the soil discharged from the shovel may fall in order to be conveyed away.

88. An excavating machine including a frame work, soil-removing mechanism carried thereby, said soil-removing mechanism including a shovel having a bottom inclined with respect to the horizontal, mechanism for agitating the shovel, the pivotal connection of the shovel with the frame work being afforded by link mechanism 78, spring cushions 88 interposed between said link mechanism and the frame work, whereby the shovel may yield when encountering superior resistance, and a conveyer disposed to the rear of the shovel upon which the soil discharged from the shovel may fall in order to be conveyed away.

89. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, the pivotal connection of the shovel with the frame work being afforded by link mechanism 78, spring cushions 88 interposed between said link mechanism and the frame work, whereby the shovel may yield when encountering superior resistance, and a conveyer disposed to the rear of the shovel upon which the soil discharged from the shovel may fall in order to be conveyed away.

90. An excavating machine, including a frame work, a shovel for removing soil pivotally supported by the frame work near the nose of the shovel, mechanism for raising and lowering the rear or discharge end of the shovel, the pivotal connection of the shovel with the frame work being afforded by link mechanism 78, spring cushions 88 interposed between said link mechanism and the frame work, whereby the shovel may yield when encountering superior resistance, and a conveyer disposed to the rear of the shovel upon which the soil discharged from the shovel may fall in order to be conveyed away.

91. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, the pivotal connection of the shovel with the frame work being afforded by link mechanism 78, spring cushions 88 interposed between said link mechanism and the frame work, whereby the shovel may yield when encountering superior resistance, and a conveyer disposed to the rear of the shovel upon which the soil discharged from the shovel may fall in order to be conveyed away.

92. An excavating machine including a frame work, soil-removing mechanism carried thereby, said soil-removing mechanism including a shovel having a bottom inclined with respect to the horizontal, mechanism for agitating the shovel, means whereby the shovel may be raised and lowered with respect to said frame work, and a conveyer disposed to the rear of the shovel upon which the soil discharged from the shovel may fall in order to be conveyed away.

93. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, means whereby the shovel may be raised and lowered with respect to said frame work, and a conveyer disposed to the rear of the shovel upon which the soil discharged from the shovel may fall in order to be conveyed away.

94. An excavating machine including a frame work, a shovel for removing soil pivotally supported by the frame work near the nose of the shovel, mechanism for raising and lowering the rear or discharge end of the shovel, means whereby the shovel may be raised and lowered with respect to said frame work, and a conveyer disposed to the rear of the shovel upon which the soil discharged from the shovel may fall in order to be conveyed away.

95. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, means whereby the shovel may be raised and lowered with respect to said frame work, and a conveyer disposed to the rear of the shovel upon which the soil discharged from the shovel may fall in order to be conveyed away.

96. An excavating machine including a frame work, soil-removing mechanism carried thereby, said soil-removing mechanism including a shovel having a bottom inclined with respect to the horizontal, mechanism for agitating the shovel, the pivotal connection of the shovel with the frame work being afforded by link mechanism 78, spring cushions 88 interposed between said link mechanism and the frame work, whereby the shovel may yield when encountering superior resistance, means whereby the shovel may be raised and lowered with respect to said frame work, and a conveyer disposed to the rear of the shovel upon which the soil discharged from the shovel may fall in order to be conveyed away.

97. An excavating machine including a frame work, soil-removing mechanism carried thereby, said soil-removing mechanism including a shovel having a bottom inclined with respect to the horizontal, mechanism for agitating the shovel, said mechanism serving to move the upper and rear or discharge end of the shovel more violently than the nose of the shovel, the pivotal connection of the shovel with the frame work being afforded by link mechanism 78, spring cushions 88 interposed between said link mechanism and the frame work, whereby the shovel may yield when encountering superior resistance, means whereby the shovel may be raised and lowered with respect to said frame work, and a conveyer disposed to the rear of the shovel upon which the soil discharged from the shovel may fall in order to be conveyed away.

98. An excavating machine including a frame work, a shovel for removing soil pivotally supported by the frame work near the nose of the shovel, mechanism for raising and lowering the rear or discharge end of the shovel, the pivotal connection of the shovel with the frame work being afforded by link mechanism 78, spring cushions 88 interposed between said link mechanism and the frame work, whereby the shovel may yield when encountering superior resistance, means whereby the shovel may be raised and lowered with respect to said frame work, and a conveyer disposed to the rear of the shovel upon which the soil discharged from the shovel may fall in order to be conveyed away.

99. An excavating machine including a frame work, a shovel for removing soil pivotally supported by the frame work near the nose of the shovel, a link 79 connected at one end with the rear or discharge end of the shovel, means for causing the other end of said link to follow a suitable line of travel, whereby the upper or discharge end of the shovel is agitated, the pivotal connection of the shovel with the frame work being afforded by link mechanism 78, spring cushions 88 interposed between said link mechanism and the frame work, whereby the shovel may yield when encountering superior resistance, means whereby the shovel may be raised and lowered with respect to said frame work, and a conveyer disposed to the rear of the shovel upon which the soil discharged from the shovel may fall in order to be conveyed away.

100. An excavating machine including a frame work carrying machinery of the excavator, a conveyer extending from the rear of the frame work, and a float structure for supporting an outer portion of the conveyer.

101. An excavating machine including a frame work carrying machinery of the excavator, a conveyer extending from the rear of the frame work, a float structure for supporting an outer portion of said conveyer, and mechanism for raising and lowering the float structure.

102. An excavating machine including a frame work carrying machinery of the excavator, a conveyer extending from the rear of the frame work, a float structure for supporting an outer portion of the conveyer, and mechanism for raising and lowering the float structure.

103. An excavating machine including a frame work carrying machinery of the excavator, a conveyer extending from the rear of the frame work, and a float structure for supporting an outer portion of the conveyer, the connection between the conveyer and the said frame work permitting the conveyer to swing upon either side of the frame work and permitting the conveyer to trail behind the frame work.

104. An excavating machine including a frame work carrying machinery of the excavator, a conveyer extending from the rear of the frame work, a float structure for supporting an outer portion of said conveyer, and mechanism for raising and lowering the float structure, the connection between the conveyer and the said frame work permitting the conveyer to swing upon either side of the frame work and permitting the conveyer to trail behind the frame work.

105. An excavating machine including a frame work carrying machinery of the excavator, a conveyer extending from the rear of the frame work, a float structure for supporting an outer portion of the conveyer, and mechanism for raising and lowering the float structure, the connection between the conveyer and the said frame work permitting the conveyer to swing upon either side of the frame work and permitting the conveyer to trail behind the frame work.

106. An excavating machine including a frame work carrying machinery of the excavator, a conveyer extending from the frame work, and a wheel structure for supporting an outer portion of the conveyer.

107. An excavating machine including a frame work carrying machinery of the excavator, a conveyer extending from the frame work, a wheel structure for supporting an outer portion of the conveyer, and means for driving the wheel structure.

108. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, and swinging trucks for the wheels, whereby the planes of rotation of said wheels may be changed.

109. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, swinging trucks for the wheels, whereby the planes of rotation of said wheels may be changed, and mountings for the wheels, whereby they may be raised and lowered with respect to their trucks.

110. An excavating machine including a frame work carrying machinery of the excavator, a conveyer extending from the frame work, a wheel structure for supporting an outer portion of the conveyer, and means for driving said wheels.

111. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, swinging trucks for the wheels, whereby the planes of rotation of said wheels may be changed, and means for driving said wheels.

112. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, swinging trucks for the wheels, whereby the planes of rotation of said wheels may be changed, mountings for the wheels, whereby they may be raised and lowered with respect to their trucks, and means for driving said wheels.

113. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, and swinging trucks for the wheels, whereby the planes of rotation of said wheels may be changed, the connection between the conveyer and the said frame work permitting the conveyer to swing upon either side of the frame work and to trail behind the same as desired.

114. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, swinging trucks for the wheels, whereby the planes of rotation of said wheels may be changed, and mountings for the wheels, whereby they may be raised and lowered with respect to their trucks, the connection between the conveyer and the said frame work permitting the conveyer to swing upon either side of the frame work and to trail behind the same as desired.

115. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, swinging trucks for the wheels, whereby the planes of rotation of said wheels may be changed, and means for driving said wheels, the connection between the conveyer and the said frame work permitting the conveyer to swing upon either side of the frame work and to trail behind the same as desired.

116. An excavating machine including a frame work carrying machinery of the excavator, a conveyer extending from the frame work and swingingly connected with the frame work, a structure for supporting an outer portion of the conveyer, said structure including two wheels, a frame work therefor extending transversely to the conveyer, swinging trucks for the wheels, whereby the planes of rotation of said wheels may be changed, mountings for the wheels, whereby they may be raised and lowered with respect to their trucks, and means for driving said wheels, the connection between the conveyer and the said frame work permitting the conveyer to swing upon either side of the frame work and to trail behind the same as desired.

117. An excavating machine including a frame work, soil-removing mechanism carried thereby, said soil-removing mechanism including a shovel, and mechanism for agitating the shovel.

In witness whereof, I hereunto subscribe my name this sixth day of June A. D., 1908.

CHARLES L. LILLEBERG.

Witnesses:
GEORGE L. CRAGG,
L. G. STROH.